US008831965B2

(12) United States Patent
Lurie

(10) Patent No.: US 8,831,965 B2
(45) Date of Patent: Sep. 9, 2014

(54) APPARATUS AND METHOD FOR ONLINE ADVICE CUSTOMER RELATIONSHIP MANAGEMENT

(75) Inventor: Steven Lurie, San Francisco, CA (US)

(73) Assignee: YP Interactive LLC, Wilmington, DE (US)

( * ) Notice: Subject to any disclaimer, the term of this patent is extended or adjusted under 35 U.S.C. 154(b) by 993 days.

(21) Appl. No.: 12/270,460

(22) Filed: Nov. 13, 2008

(65) Prior Publication Data

US 2009/0063246 A1 Mar. 5, 2009

Related U.S. Application Data

(63) Continuation of application No. 10/021,877, filed on Dec. 14, 2001, now Pat. No. 7,580,850.

(51) Int. Cl.
*G06Q 10/00* (2012.01)
(52) U.S. Cl.
USPC .......................................................... 705/7.11
(58) Field of Classification Search
USPC ................................................ 705/7–8, 7.11
See application file for complete search history.

(56) References Cited

U.S. PATENT DOCUMENTS

| | | | |
|---|---|---|---|
| 4,313,035 A | 1/1982 | Jordan et al. |
| 4,577,065 A | 3/1986 | Frey et al. |
| 4,631,428 A | 12/1986 | Grimes |
| 4,645,873 A | 2/1987 | Chomet |
| 4,677,434 A | 6/1987 | Fascenda |
| 4,723,283 A | 2/1988 | Nagasawa et al. |
| 4,741,025 A | 4/1988 | Maruyama et al. |
| 4,751,669 A | 6/1988 | Sturgis et al. |
| 4,752,675 A | 6/1988 | Zetmeir |
| 4,796,293 A | 1/1989 | Blinken et al. |
| 4,847,890 A | 7/1989 | Solomon et al. |
| 4,878,239 A | 10/1989 | Solomon et al. |
| 4,969,185 A | 11/1990 | Dorst et al. |
| 5,017,917 A | 5/1991 | Fisher et al. |

(Continued)

FOREIGN PATENT DOCUMENTS

| | | |
|---|---|---|
| AU | 699785 | 5/1995 |
| EP | 1489529 | 12/2004 |

(Continued)

OTHER PUBLICATIONS

Neches et al (Collaborative Information Space Analysis Tools), Dec. 1998, D-Lib Web Magazines, pp. 1-14.*

(Continued)

*Primary Examiner* — Romain Jeanty
(74) *Attorney, Agent, or Firm* — Greenberg Traurig LLP

(57) ABSTRACT

An apparatus and method for online advice customer relationship management are described. The method includes the determination of a service provider ID code from a requesting service provider. Once a service provider ID code is determined, a list of service seekers that have received advice regarding a field of service from a service provider corresponding to the service provider ID code is generated. Once generated, the listing of service seekers is displayed via a customer management screen. As such, system administrators, as well as the service providers themselves, may view listings of service seekers in order to provide relationship management of the service seekers, such as for example, providing incentives to service seekers for follow-up advice, as well as blocking undesired service seekers from further contact with the service provider.

21 Claims, 17 Drawing Sheets

(56) References Cited

U.S. PATENT DOCUMENTS

| | | |
|---|---|---|
| 5,058,152 A | 10/1991 | Solomon et al. |
| 5,099,510 A | 3/1992 | Blinken, Jr. et al. |
| 5,148,474 A | 9/1992 | Haralambopoulos et al. |
| 5,155,743 A | 10/1992 | Jacobs |
| 5,155,761 A | 10/1992 | Hammond |
| 5,182,769 A | 1/1993 | Yamaguchi et al. |
| 5,206,903 A | 4/1993 | Kohler et al. |
| 5,319,542 A | 6/1994 | King, Jr. et al. |
| 5,325,424 A | 6/1994 | Grube |
| 5,339,358 A | 8/1994 | Danish et al. |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,373,549 A | 12/1994 | Bales et al. |
| 5,436,957 A | 7/1995 | McConnell |
| 5,448,625 A | 9/1995 | Lederman |
| 5,453,352 A | 9/1995 | Tachibana |
| 5,459,779 A | 10/1995 | Backaus et al. |
| 5,469,497 A | 11/1995 | Pierce et al. |
| 5,483,352 A | 1/1996 | Fukuyama et al. |
| 5,483,588 A | 1/1996 | Eaton et al. |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,539,813 A | 7/1996 | Jonsson |
| 5,544,237 A | 8/1996 | Bales et al. |
| 5,555,298 A | 9/1996 | Jonsson |
| 5,557,677 A | 9/1996 | Prytz |
| 5,559,875 A | 9/1996 | Bieselin et al. |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,604,803 A | 2/1997 | Aziz |
| 5,608,786 A | 3/1997 | Gordon |
| 5,615,213 A | 3/1997 | Griefer |
| 5,619,148 A | 4/1997 | Guo |
| 5,619,555 A | 4/1997 | Fenton et al. |
| 5,619,570 A | 4/1997 | Tsutsui |
| 5,619,725 A | 4/1997 | Gordon |
| 5,619,991 A | 4/1997 | Sloane |
| 5,623,536 A | 4/1997 | Solomon et al. |
| 5,634,012 A | 5/1997 | Stefik et al. |
| 5,638,432 A | 6/1997 | Wille et al. |
| 5,644,715 A | 7/1997 | Baugher |
| 5,651,058 A | 7/1997 | Hackett-Jones et al. |
| 5,668,953 A | 9/1997 | Sloo |
| 5,675,734 A | 10/1997 | Hair |
| 5,689,553 A | 11/1997 | Ahuja et al. |
| 5,694,163 A | 12/1997 | Harrison |
| 5,694,537 A | 12/1997 | Montenegro et al. |
| 5,694,549 A | 12/1997 | Carlin et al. |
| 5,701,419 A | 12/1997 | McConnell |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,724,521 A | 3/1998 | Dedrick |
| 5,734,961 A | 3/1998 | Castille |
| 5,740,231 A | 4/1998 | Cohn et al. |
| 5,740,549 A | 4/1998 | Reilly et al. |
| 5,745,681 A | 4/1998 | Levine et al. |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Petrecca et al. |
| 5,794,210 A | 8/1998 | Goldhaber et al. |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kanai et al. |
| 5,835,896 A | 11/1998 | Fisher et al. |
| 5,841,763 A | 11/1998 | Leondires et al. |
| 5,842,212 A | 11/1998 | Ballurio et al. |
| 5,845,265 A | 12/1998 | Woolston |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,903,877 A | 5/1999 | Berkowitz et al. |
| 5,907,677 A | 5/1999 | Glenn et al. |
| 5,911,132 A | 6/1999 | Sloane |
| 5,914,951 A | 6/1999 | Bentley et al. |
| 5,915,214 A | 6/1999 | Reece et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,943,422 A | 8/1999 | Van Wie et al. |
| 5,946,646 A | 8/1999 | Schena et al. |
| 5,948,054 A | 9/1999 | Nielsen |
| 5,960,416 A | 9/1999 | Block |
| 5,974,141 A | 10/1999 | Saito |
| 5,974,398 A | 10/1999 | Hanson et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,999,609 A | 12/1999 | Nishimura |
| 5,999,611 A | 12/1999 | Tatchell et al. |
| 6,006,197 A | 12/1999 | D'Eon et al. |
| 6,011,794 A | 1/2000 | Mordowitz et al. |
| 6,014,439 A | 1/2000 | Walker et al. |
| 6,014,644 A | 1/2000 | Erickson |
| 6,016,478 A | 1/2000 | Zhang et al. |
| 6,026,087 A | 2/2000 | Mirashrafi et al. |
| 6,026,148 A | 2/2000 | Dworkin et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardner et al. |
| 6,067,561 A | 5/2000 | Dillon |
| 6,078,866 A | 6/2000 | Buck et al. |
| 6,108,493 A | 8/2000 | Miller et al. |
| 6,130,933 A | 10/2000 | Miloslavsky |
| 6,131,085 A | 10/2000 | Rossides |
| 6,144,670 A | 11/2000 | Sponaugle et al. |
| 6,167,379 A | 12/2000 | Dean et al. |
| 6,167,449 A | 12/2000 | Arnold et al. |
| 6,173,279 B1 | 1/2001 | Levin et al. |
| 6,175,619 B1 | 1/2001 | DeSimone |

(56) References Cited

U.S. PATENT DOCUMENTS

| | | |
|---|---|---|
| 6,185,194 B1 | 2/2001 | Musk et al. |
| 6,185,289 B1 | 2/2001 | Hetz et al. |
| 6,188,673 B1 | 2/2001 | Bauer et al. |
| 6,188,761 B1 | 2/2001 | Dickerman et al. |
| 6,192,050 B1 | 2/2001 | Stovall |
| 6,199,096 B1 | 3/2001 | Mirashrafi et al. |
| 6,212,192 B1 | 4/2001 | Mirashrafi et al. |
| 6,212,268 B1 | 4/2001 | Nielsen |
| 6,216,111 B1 | 4/2001 | Walker et al. |
| 6,223,165 B1 | 4/2001 | Lauffer |
| 6,230,287 B1 | 5/2001 | Pinard et al. |
| 6,233,566 B1 | 5/2001 | Levine et al. |
| 6,243,684 B1 | 6/2001 | Stuart et al. |
| 6,246,875 B1 | 6/2001 | Seazholtz et al. |
| 6,248,946 B1 | 6/2001 | Dwek |
| 6,259,774 B1 | 7/2001 | Miloskavsky |
| 6,266,651 B1 | 7/2001 | Woolston |
| 6,269,336 B1 | 7/2001 | Ladd et al. |
| 6,269,361 B1 | 7/2001 | Davis et al. |
| 6,282,515 B1 | 8/2001 | Speicher |
| 6,292,799 B1 | 9/2001 | Peek et al. |
| 6,298,056 B1 | 10/2001 | Pendse |
| 6,301,342 B1 | 10/2001 | Ander et al. |
| 6,301,350 B1 | 10/2001 | Henningson et al. |
| 6,304,637 B1 | 10/2001 | Mirashrafi et al. |
| 6,310,941 B1 | 10/2001 | Crutcher et al. |
| 6,311,231 B1 | 10/2001 | Bateman et al. |
| 6,314,402 B1 | 11/2001 | Monaco et al. |
| 6,314,454 B1 | 11/2001 | Wang et al. |
| 6,323,894 B1 | 11/2001 | Katz |
| 6,353,663 B1 | 3/2002 | Stevens et al. |
| 6,381,325 B1 | 4/2002 | Hanson |
| 6,385,583 B1 | 5/2002 | Ladd et al. |
| 6,389,278 B1 | 5/2002 | Singh |
| 6,389,400 B1 * | 5/2002 | Bushey et al. .................. 705/7 |
| 6,389,541 B1 | 5/2002 | Patterson |
| 6,393,117 B1 | 5/2002 | Trell |
| 6,393,412 B1 | 5/2002 | Deep |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,408,278 B1 | 6/2002 | Carney et al. |
| 6,430,276 B1 | 8/2002 | Bouvier et al. |
| 6,434,527 B1 | 8/2002 | Horvitz |
| 6,461,162 B1 | 10/2002 | Reitman et al. |
| 6,463,136 B1 | 10/2002 | Malik |
| 6,470,079 B1 | 10/2002 | Benson |
| 6,470,317 B1 | 10/2002 | Ladd et al. |
| 6,470,338 B1 | 10/2002 | Rizzo et al. |
| 6,477,246 B1 | 11/2002 | Dolan et al. |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,504,920 B1 | 1/2003 | Okon et al. |
| 6,510,417 B1 | 1/2003 | Woods et al. |
| 6,513,013 B1 | 1/2003 | Stephanou |
| 6,519,570 B1 | 2/2003 | Faber et al. |
| 6,523,010 B2 | 2/2003 | Lauffer |
| 6,529,878 B2 | 3/2003 | De Rafael et al. |
| 6,529,946 B2 | 3/2003 | Yokono et al. |
| 6,535,506 B1 | 3/2003 | Narain et al. |
| 6,539,359 B1 | 3/2003 | Ladd et al. |
| 6,542,732 B1 | 4/2003 | Khazaka et al. |
| 6,546,372 B2 | 4/2003 | Lauffer |
| 6,549,889 B2 | 4/2003 | Lauffer |
| 6,560,576 B1 | 5/2003 | Cohen et al. |
| 6,563,915 B1 | 5/2003 | Salimando |
| 6,606,376 B1 | 8/2003 | Trell |
| 6,609,106 B1 | 8/2003 | Robertson |
| 6,611,501 B1 | 8/2003 | Owen et al. |
| 6,625,595 B1 | 9/2003 | Anderson et al. |
| 6,628,760 B2 | 9/2003 | Mirashrafi et al. |
| 6,636,590 B1 | 10/2003 | Jacob et al. |
| 6,658,389 B1 | 12/2003 | Alpdemir |
| 6,668,286 B2 | 12/2003 | Bateman et al. |
| 6,691,093 B2 | 2/2004 | Shell |
| 6,704,403 B2 | 3/2004 | Lurie et al. |
| 6,731,625 B1 | 5/2004 | Eastep et al. |
| 6,732,183 B1 | 5/2004 | Graham |
| 6,735,588 B2 | 5/2004 | Kim et al. |
| 6,741,691 B1 | 5/2004 | Ritter et al. |
| 6,757,364 B2 | 6/2004 | Newkirk |
| 6,771,640 B2 | 8/2004 | Karamchedu et al. |
| 6,771,760 B1 | 8/2004 | Vortman et al. |
| 6,775,359 B1 | 8/2004 | Ron et al. |
| 6,778,652 B2 | 8/2004 | Gaus et al. |
| 6,798,753 B1 | 9/2004 | Doganata et al. |
| 6,801,899 B2 | 10/2004 | Lauffer |
| 6,807,532 B1 | 10/2004 | Kolls |
| 6,807,571 B2 | 10/2004 | Hatano et al. |
| 6,836,225 B2 | 12/2004 | Lee et al. |
| 6,839,737 B1 | 1/2005 | Friskel |
| 6,865,540 B1 | 3/2005 | Faber et al. |
| 6,898,435 B2 | 5/2005 | Milman |
| 6,910,035 B2 | 6/2005 | Hoekman et al. |
| 6,910,159 B2 | 6/2005 | Phillips et al. |
| 6,968,174 B1 | 11/2005 | Trandal et al. |
| 6,990,183 B2 | 1/2006 | Holland et al. |
| 6,999,478 B2 | 2/2006 | D'Angelo |
| 7,031,697 B2 | 4/2006 | Yang et al. |
| 7,032,030 B1 | 4/2006 | Codignotto |
| 7,035,468 B2 | 4/2006 | Yogeshwar et al. |
| 7,035,634 B2 | 4/2006 | Mead et al. |
| 7,046,782 B2 | 5/2006 | Miller |
| 7,103,010 B2 | 9/2006 | Melideo |
| 7,181,415 B2 | 2/2007 | Blaser et al. |
| 7,200,413 B2 | 4/2007 | Montemer et al. |
| 7,212,615 B2 | 5/2007 | Wolmuth |
| 7,224,781 B2 | 5/2007 | Jacob et al. |
| 7,240,110 B2 | 7/2007 | Haitsuka et al. |
| 7,240,290 B2 | 7/2007 | Melideo |
| 7,289,612 B2 | 10/2007 | Lurie et al. |
| 7,289,623 B2 | 10/2007 | Lurie |
| 7,315,837 B2 | 1/2008 | Sloan et al. |
| 7,359,498 B2 | 4/2008 | Faber et al. |
| 7,366,683 B2 | 4/2008 | Altberg et al. |
| 7,380,139 B2 | 5/2008 | Tagawa et al. |
| 7,412,043 B2 | 8/2008 | Horvath et al. |
| 7,433,459 B2 | 10/2008 | Reding |
| 7,434,169 B2 | 10/2008 | Quillen et al. |
| 7,434,175 B2 | 10/2008 | Melideo |
| 7,475,149 B2 | 1/2009 | Jacob et al. |
| 7,496,357 B2 | 2/2009 | Dunn et al. |
| 7,580,850 B2 | 8/2009 | Lurie |
| 2001/0025274 A1 | 9/2001 | Zehr et al. |
| 2001/0026609 A1 | 10/2001 | Weinstein et al. |
| 2001/0027481 A1 | 10/2001 | Whyel |
| 2001/0029482 A1 | 10/2001 | Tealdi et al. |
| 2001/0032247 A1 | 10/2001 | Kanaya |
| 2001/0037283 A1 | 11/2001 | Mullaney |
| 2001/0044751 A1 | 11/2001 | Pugliese et al. |
| 2001/0048737 A1 | 12/2001 | Goldberg et al. |
| 2002/0003867 A1 | 1/2002 | Rothschild et al. |
| 2002/0010608 A1 | 1/2002 | Faber et al. |
| 2002/0010616 A1 | 1/2002 | Itzhaki |
| 2002/0024948 A1 | 2/2002 | Pendse |
| 2002/0038233 A1 | 3/2002 | Shubov et al. |
| 2002/0038293 A1 | 3/2002 | Seiden |
| 2002/0059082 A1 | 5/2002 | Moczygemba |
| 2002/0069105 A1 | 6/2002 | do Rosario Botelho et al. |
| 2002/0071423 A1 | 6/2002 | Mirashrafi et al. |
| 2002/0072974 A1 | 6/2002 | Pugliese et al. |
| 2002/0073207 A1 | 6/2002 | Widger et al. |
| 2002/0095331 A1 | 7/2002 | Osman et al. |
| 2002/0095359 A1 | 7/2002 | Mangetsu |
| 2002/0107697 A1 | 8/2002 | Jensen |
| 2002/0112005 A1 | 8/2002 | Namias |
| 2002/0116266 A1 | 8/2002 | Marshall |
| 2002/0120554 A1 | 8/2002 | Vega |
| 2002/0128891 A1 * | 9/2002 | McSherry .................. 705/8 |
| 2002/0133402 A1 | 9/2002 | Faber et al. |
| 2002/0169836 A1 | 11/2002 | Hood et al. |

(56) References Cited

U.S. PATENT DOCUMENTS

| | | |
|---|---|---|
| 2002/0191762 A1 | 12/2002 | Benson |
| 2002/0193094 A1 | 12/2002 | Lawless et al. |
| 2002/0193135 A1 | 12/2002 | Nakano |
| 2003/0005126 A1 | 1/2003 | Schwartz et al. |
| 2003/0041255 A1 | 2/2003 | Chen et al. |
| 2003/0046161 A1 | 3/2003 | Kamangar et al. |
| 2003/0061094 A1 | 3/2003 | Banerjee et al. |
| 2003/0112944 A1 | 6/2003 | Brown et al. |
| 2003/0115089 A1 | 6/2003 | Lurie |
| 2003/0126205 A1 | 7/2003 | Lurie |
| 2003/0163356 A1* | 8/2003 | Marks et al. ............... 705/7 |
| 2003/0220866 A1 | 11/2003 | Pisaris-Henderson et al. |
| 2003/0223565 A1 | 12/2003 | Montemer |
| 2003/0225682 A1 | 12/2003 | Montemer |
| 2004/0006511 A1 | 1/2004 | Montemer |
| 2004/0010518 A1 | 1/2004 | Montemer |
| 2004/0083133 A1 | 4/2004 | Nicholas et al. |
| 2004/0162757 A1 | 8/2004 | Pisaris-Henderson et al. |
| 2004/0196833 A1 | 10/2004 | Dahan et al. |
| 2004/0234049 A1 | 11/2004 | Melideo |
| 2004/0254859 A1 | 12/2004 | Aslanian |
| 2004/0260413 A1 | 12/2004 | Melideo |
| 2005/0048961 A1 | 3/2005 | Ribaudo et al. |
| 2005/0065811 A1 | 3/2005 | Chu et al. |
| 2005/0071509 A1 | 3/2005 | Faber et al. |
| 2005/0080878 A1 | 4/2005 | Cunningham et al. |
| 2005/0086104 A1 | 4/2005 | McFadden |
| 2005/0114210 A1 | 5/2005 | Faber et al. |
| 2005/0119957 A1 | 6/2005 | Faber et al. |
| 2005/0165666 A1 | 7/2005 | Wong et al. |
| 2005/0203799 A1 | 9/2005 | Faber et al. |
| 2005/0209874 A1 | 9/2005 | Rossini |
| 2005/0216341 A1 | 9/2005 | Agarwal et al. |
| 2005/0222908 A1 | 10/2005 | Altberg et al. |
| 2005/0251445 A1 | 11/2005 | Wong et al. |
| 2006/0031516 A1 | 2/2006 | Kumer |
| 2006/0075104 A1 | 4/2006 | Kumer |
| 2006/0095343 A1 | 5/2006 | Clarke et al. |
| 2006/0184378 A1 | 8/2006 | Agarwal et al. |

FOREIGN PATENT DOCUMENTS

| | | |
|---|---|---|
| GB | 2329046 | 3/1999 |
| JP | 9233441 | 9/1997 |
| JP | 9319812 | 12/1997 |
| JP | 2002007887 | 1/2002 |
| WO | 9705733 | 2/1997 |
| WO | 9802835 | 1/1998 |
| WO | 9804061 | 1/1998 |
| WO | 9813765 | 4/1998 |
| WO | 9838558 | 9/1998 |
| WO | 0057326 | 9/2000 |
| WO | 0073960 | 12/2000 |
| WO | 0101217 | 1/2001 |
| WO | 0120518 | 3/2001 |
| WO | 0127825 | 4/2001 |
| WO | 0128141 | 4/2001 |
| WO | 0144973 | 6/2001 |
| WO | 0184415 | 11/2001 |
| WO | 0213110 | 2/2002 |
| WO | 0237470 | 5/2002 |
| WO | 0244870 | 6/2002 |
| WO | 2005109287 | 11/2005 |

OTHER PUBLICATIONS

"Applying Technology News," Accounting Technology, p. 14, Feb./Mar. 1997.
"TriNet's 'Help Me, I'm Stuck' Internet Voice Button Services Pushes Web Pages to Online Users," Business Wire, Mar. 25, 1998.
allexperts.com, company information retrieved from http://www.allexperts.com, available at least by Apr. 9, 2000.
answers.com, company information retrieved from http://www.answers.com, available at least by Aug. 8, 2000.
Dalton, Gregory, "Rent-An-Expert on the Web," Information Week, p. 75, Sep. 6, 1999.
exp.com, Inc., company information retrieved from http://www.exp.com, available at least by Sep. 20, 2000.
expertcity.com, "About Us," company information retrieved from http://www.expertcity.com, available at least by Apr. 9, 2000.
Experts Exchange, Inc., company information retrieved from http://www.experts-exchange.com, available at least by Apr. 9, 2000.
University of Texas—Austin, information on the Electronic Emissary Project retrieved at www.tapr.org/emissary, available at least by Apr. 9, 2000.
Wasik, Joann M., "Information for Sale: Commercial Digital Reference and AskA Services," Virtual Reference Desk, http://www.vrd.org/AskA/commAskA.html, Sep. 20, 1999.
Wieland, Heidi et al., "Expertcity.com Launches Premier Online Marketplace for Expert Services," PR Newswire, Aug. 30, 1999.
Sterling, Greg, "Ingenio's Ether—Pay Per Professional Advice," Search Engine Journal, Mar. 3, 2006.
USPTO Transaction History of U.S. Appl. No. 10/021,877, filed Dec. 14, 2001, entitled Apparatus and Method for Online Advice Customer Relationship Management.
ADS-Click, "ADS-click Adds Skype-Based Pay-Per-Call Advertising Capabilities to Its Private-Labeled Solution, which will be Unveiled at ad:tech New York," Market Wire, Oct. 10, 2005.
Greenberg, Ken, "Jambo Launches to Connect People and Businesses from the Internet to the Phone," Market Wire, May 3, 2005.
Greenberg, Ken, "Jambo Names Netzero Co-founder Stacy Haitsuka to New Post of Chief Information Officer," Business Wire, Jul. 5, 2005.
Greenberg, Ken, "Jambo Receives $5 Million in Financing from Kline Hawkes & Co., Westlake Venture Partners, Others," Business Wire, Oct. 17, 2005.
Jambo, "Welcome to Jambo—The Leader in Pay-Per-Call Solutions," company information retrieved from http://www.jambo.com, available at least by Oct. 17, 2005.
Jingle Networks, Inc., "1-800-FREE411 Provides Two Great Opportunities to Acquire New Customers," available at least by Oct. 20, 2005.
Jingle Networks, Inc., "Introducing 1-800 FREE411: First Nationwide Free Telephone Directory Assistance Service," Sep. 20, 2005.
International Application No. PCT/US05/12061, Written Opinion and International Search Report, Nov. 17, 2006.
"Connecting to On-Line Car Shoppers: Auto Sellers Use Netcall Internet Call-Button Technology to Turn 'Clicks' into Interactive Sales," Business Wire, p. 4089, Jul. 19, 1999.
"Keen.com raises $60 Million from Prestigious Investors and Strategic Partners Just 60 Days After Launch of Its Live Answer Community," Business Wire, Jan. 11, 2000.
"NetCall Internet Call Buttons Enhance E-Commerce Customer Service and Sales," PR Newswire, p. 7431, Aug. 9, 1999.
"Sell and Buy Advice Online," The Ottawa Citizen, p. D7, Nov. 29, 1999.
Addeo, E.J. et al., "An Experimental Multi-Media Bridging System," Frontiers in Computer Communications Technology, Computer Communications Review, vol. 17, No. 5, pp. 236-242, Aug. 11-13, 1987.
Alexander, Kelly King et al., "1-900 (Pay-For-Information Phone Services)," Baton Rouge Business Report, vol. 9, No. 20, pp. 23-27, Jul. 30, 1991.
Angelo, Simon, "SurfBrains.com: Brains Online Save Time & Money," M2 Presswire, Jul. 11, 2000.
Asthana, Abhaya et al., "A Small Domain Communications System for Personalized Shopping Assistance," IEEE International Conference on Personal Wireless Communications, Publication No. 0-7803-1996-6/94, pp. 199-203, Aug. 18, 1994.
Bazini, Liz, "UpSnap Selects LookSmart to Sell Premium Listings on Free 411 Service for Text-Enabled Cell Phones," Nov. 4, 2004.
Becker, Ralph, "ISDN Tutorial: Interfaces," retrieved from http://www.ralphb.net/ISDN/ifaces.html, available at least by Apr. 21, 2000.
Becker, Ralph, "ISDN Tutorial: Definitions," retrieved from http://www.ralphb.net/ISDN/defs.html, available at least by Apr. 21, 2000.

(56) References Cited

OTHER PUBLICATIONS

Broad, Doug et al., "Lucent Technology and Netscape Team to Deliver Lucent Ecommerce Solutions," Business Wire, Sep. 23, 1998.
Chimiak, William H. et al., "Multimedia Collaborative Remote Consultation Tools via Gigabit WAN in Teleradiology," IEEE 13th Annual International Phoenix Conference on Computers and Communications, pp. 417-423, Apr. 12-15, 1994.
Clark, Don, "Keen.com Plans Web Service Allowing Customers to Hold Private Phone Chats," Wall Street Journal, Nov. 8, 1999.
Collett, Stacey et al., "Why Online Browsers Don't Become Buyers," Computerworld, vol. 33, No. 48, p. 14, Nov. 29, 1999.
Davey, Tom, "Wheeling and Dealing Online," PC Week, vol. 13, No. 45, pp. 1, 129, Nov. 11, 1996.
De Lasser, Eleena, "When Business Plan and Real World Clash," Wall Street Journal, p. B1, Jun. 1999.
Drescher, Bob et al., "Aspect Telecommunications Integrates the Web into the Call Center to Deliver New Level of Customer Service," Business Wire, Aug. 5, 1996.
Dyson, Esther, "Information, Bid and Asked," Forbes, p. 92, Aug. 20, 1990.
Ek, Brian, "Walker Digital Issued Landmark U.S. Patent No. 5,862,223 for Global Internet Marketplace for Experts", Business Wire, Jan. 26, 1999.
Ellis, James E. "For Telesphere's Clients, Dial 1-900 TUF LUCK," Business Week, pp. 88-89, Sep. 9, 1991.
European Patent Office, Search Report for European Patent Application No. EP04253389.3, Sep. 17, 2004.
Green Digital Media, Inc. Big Green Blog: Jan. 2005 Archives, Jan. 28-31, 2005.
Greenblatt, Ellen, "Have You Ever Wondered . . . " Datamation, p. 126, Oct. 1997.
Griffiths, J.W.R. et al., "Multimedia Communication in a Medical Environment," Singapore International Conference on Networks, pp. 166-171, Sep. 5, 1991.
Hase, Masahiko et al., "Advanced Videophone System Using Synchronized Video Filing Equipment," NTT Review, vol. 3, No. 4, pp. 29-36, Jul. 1991.
Healey, John, "From A-Z: You Can Sell Advice Online," San Jose Mercury News, retrieved from http://www.mercurycenter.com on Oct. 24, 2001.
Herman, Edith, "U.S. Courts to Launch First Federal 900 Service," Federal Computer Week, pp. 8, 10, Sep. 28, 1992.
Herzberg, Amir et al., "MiniPay: Charging Per Click on the Web," Computer Networks and ISDN Systems, vol. 29, pp. 939-951, Sep. 1997.
Hodgson, Cynthia, "Online Expert Databases & Services," Econtent, pp. 48-53, Dec. 1999.
Information Markets Corp., company information retrieved from http://www.infomarkets.com, available at least by Aug. 8, 2000.
Ingenio, Inc "Keen: Your Personal Advisor," retrieved from http://www.keen.com, available at least by Feb. 4, 2006.
Ingenio, Inc., Press Archives for 2004, retrieved from http://www.ingenio.com on Feb. 21, 2006.
About Intellectexchange.com, Inc., company information retrieved from http://www.intellectexchange.com/About.asp, pp. 1-12, available at least by Aug. 8, 2000.
International Application No. PCT/US01/48284, International Search Report, May 13, 2002.
Jarvie, Barbara, "Company Devoted to Hot-Line Support," Computer Reseller News, p. 48, Oct. 21, 1991.
Kabeya, Kiyoshi et al., "A New Teleconsultation Terminal System Using ISDN," NTT Review, vol. 3, No. 4, pp. 37-43, Jul. 1991.
Kanellos, Michael, "Web Watch: Do You Want To Know The Meaning of Life?," Computer Reseller News, pp. 72-74, Mar. 3, 1997.
Keen.com, "Keen.Com Launches First Live Answer Community, Connects People with Information to Share Over Their Standard Telephone," company press release, Nov. 8, 1999.
Keen.com, "The Most Popular U.S. Question and Answer Marketplace Goes International 90 Days After Launch," PR Newswire, Mar. 13, 2000.
Keen.com, company information retrieved from http://www.keen.com, available at least by 1999.
Kempner, Matt, "SWM Seeking—the Net Rather than Newspapers," Atlanta Journal the Atlanta Constitution, p. Q1, Sep. 10, 2000.
Kuehn, Richard A., "The Voice of Technology," Credit World, pp. 20-23, Jul. 1994.
Littleton, Linda, "HDD: A Helpdesk Database," Proceedings of the ACM SIGUCCS User Services Conference XXII, pp. 205-210, Oct. 16-19, 1994.
Ludwig, L.F. et al., "Laboratory for Emulation and Study of Integrated and Coordinated Media Communication, " Conference on Office Information Systems, pp. 283-291, Mar. 23-25, 1988.
Melideo, John, U.S. Appl. No. 60/471,535 entitled "HyperDial," filed May 19, 2003.
Menn, Joseph, "An Expert? There's Now a Home for You on the Internet," Los Angeles Times, retrieved from http://www.denverpost.com on Oct. 24, 2001.
Mercalli, Franco et al., "The ESSAI Teleshopping System: An Example of a Broadband Multimedia Application," IEEE Global Telecommunications Conference, pp. 572-576, Nov. 28, 1994.
Moore, Michael et al., "USA Global Link Brings Interactively to Internet Shopping," Business Wire, Oct. 7, 1998.
Ott, Chris, "Making Good on the Information Economy," Denver Business Journal, vol. 51, No. 17, p. 27A, Dec. 17, 1999.
Pelline, Jeff, "Net Firm to Connect Users by Phone," CNET News.com, Nov. 8, 1999.
Qcircuit.com, company information retrieved from http://www.qcircuit.com, available at least by Aug. 8, 2000.
Reding, Craig et al., U.S. Appl. No. 09/596,466 entitled "Methods and Apparatus for Providing Telephone Support for Internet Sales," filed Jun. 19, 2000.
Robinson, John, "Attachmate Ready to Answer 'Net Questions," Network World, p. 37, Apr. 8, 1996.
Rogers, Michael et al., "Experts Abound at New Web Sites," Library Journal, pp. 22-24, Mar. 1, 2000.
Sairamesh, Jakka et al., "NetBazaar: Networked Electronic Markets for Trading Computation and Information Services," Second European Conference on Research and Advanced Technology for Digital Libraries, pp. 839-856, Sep. 21, 1998.
Tehrani, Rich, "e-Rip Van Winkle and the 60-second Nap," Call Center Solutions, vol. 18, No. 2, pp. 16-18, Aug. 1999.
Telecommunications Buyers Guide and Directory, Editor & Publisher, pp. 29TC-38TC, Feb. 12, 1994.
Turco, Franco, "Legislation is Planned to Hem in 'Scooplines' Covers Revealing Rates, Blocking Service," Arizona Republic, Final Edition, Valley & State Section, p. B8, Jan. 16, 1988.
U.S. District Court, Southern District of New York, *Keen.com, Inc.* v. *InfoRocket.com, Inc.*, Preliminary Injunction Hearing, pp. 286-289, Jan. 8, 2002.
U.S. District Court, Southern District of New York, *Keen.com, Inc.* v. *InfoRocket.com, Inc.*: Complaint for Patent Infringement, Trade Dress Infringement and Unfair Competition; Demand for Jury Trial, Aug. 31, 2001.
Wagner, Mary, "Caring for Customers: Real-Time Text Chat and Telephony Provide Personalized Customer Support and Turn Queries into Sales Leads," Internet World Media, vol. 5, iss. 28, p. 30, Sep. 1, 1999.
Wood, Christina, "Hidden Cost of Tech Support," PC World, pp. 143-152, 156, May 1995.

\* cited by examiner

My Keen > My Customers

My Customers

Main View | Customer Lists  — 504

Manage your relationships with your customers by sending Keen Mail correspondence to them, writing notes to yourself about conversations you've had, or organizing them into customer lists. Below, you can see who called you when, what type of correspondence you had and how much the customer spent with you. Learn more about My Customers

[ Compose E-Mail ]  [ Block ]  [ Assign to List ]

| ☐ | △ | Customer | ☎ | | ✉ | Last Contact Date ▽ | Total Earnings | Customer Type |
|---|---|---|---|---|---|---|---|---|
| ☐ | | Brian Firebrand | 0 | 0 | 0 | 11/07/2001 | $0.00 | New Customers |
| ☐ | | Lady Capper | 0 | 0 | 3 | 11/07/2001 | $0.00 | New Customers |
| ☐ | | Member 831675 | 0 | 2 | 3 | 11/06/2001 | $3.00 | Unassigned |
| ☐ | | ebbe | 2 | 0 | 6 | 11/06/2001 | $20.00 | Unassigned |
| ☐ | | scott | 1 | 0 | 3 | 11/06/2001 | $30.00 | New Customers |
| ☐ | △ | Sarah Sunshine | 0 | 0 | 0 | 11/02/2001 | $1.00 | New Customers |
| ☐ | | daric | 2 | 0 | 2 | 10/31/2001 | $0.00 | New Customers |
| ☐ | △ | Rah Tiger | 1 | 0 | 0 | 10/29/2001 | $9.00 | New Customers |
| ☐ | | KenMCSE | 1 | 0 | 3 | 10/18/2001 | $2.50 | New Customers |
| ☐ | | like14141 | 0 | 0 | 1 | 10/18/2001 | $0.75 | New Customers |
| ☐ | △ | Shelly2641 | 1 | 0 | 0 | 10/18/2001 | $1.80 | New Customers |
| ☐ | | rhirson | 0 | 0 | 1 | 10/10/2001 | $3.00 | New Customers |
| ☐ | | TestStevenLurie | 1 | 1 | 1 | 10/03/2001 | $2.00 | Unassigned |
| ☐ | | saurabhmital | 0 | 0 | 0 | 10/03/2001 | $2.00 | New Customers |
| ☐ | △ | jerry2lusa98 | 0 | 0 | 0 | 10/01/2001 | $0.00 | New Customers |

CUSTOMER MANAGEMENT SCREEN 500

FIG. 3

APPARATUS AND METHOD FOR ONLINE ADVICE CUSTOMER RELATIONSHIP MANAGEMENT

CROSS-REFERENCE TO RELATED APPLICATIONS

The present patent application is a continuation application of U.S. patent application Ser. No. 10/021,877, filed Dec. 14, 2001, which is incorporated herein in its entirety by reference.

FIELD OF THE INVENTION

The invention relates generally to the field of customer relations management. More particularly, the invention relates to a method and apparatus for online advice customer relationship management.

BACKGROUND OF THE INVENTION

Consumers interested in acquiring services must first identify a service provider who is capable of providing the required services. At present, this usually means perusing a telephone directory, which can become frustrating and time-consuming if the service providers telephoned are not immediately available. In addition, a simple telephone call does not enable the service provider to charge a fee according to the time spent with his/her customers.

Systems now exist that enable providers of services to charge fees for the time spent delivering the service. 1-900 phone numbers will charge the seeker of services according to the time spent receiving the service and will transfer this payment, or a portion of it, to the provider. Each 1-900 number, however, has a very narrow scope—"Hear your Horoscope," for instance. If a seeker would like to hear an entirely different service—"Your Local Weather," for instance—he/she would have to dial a completely different 1-900 number. Similarly, each 1-900 number is quite rigid in the price, quality, and specificity of its service.

However, current systems (service provider systems) now exist that enable seekers to locate service providers according to a wide range of price, quality and specificity of service (U.S. application Ser. No. 09/414,710 and U.S. application Ser. No. 09/702,217). Such systems also make it possible for the service provider and buyer to be connected and communicate in real time. Such systems, provide service seekers the capability to select service providers via the Internet, assuming the service seeker owns or has access to the necessary computer hardware to browse the internet. In addition, a service seeker can be matched to a wide array of service providers with specific skills using only a simple audio-transmission medium such as the telephone.

The systems described above, such as for example, the service provider systems, are designed to generate capital for both the owners of the systems, as well as the service providers, which provider their services via the systems. As such, the more requests and live conversations the service provider engages in, the more money the service providers will generate. Accordingly, the more money generated by the service providers, the more money that will be generated for the service provider system. As such, the system described above not only aspire to attract as many customers as possible, but where possible, to have as many repeat customers as possible.

Therefore, the goal of each of the service provider systems described above is to provide improved compensation for the service providers and as a result, the systems themselves. Unfortunately, current means do not exist for tracking previous customers of the system. This customer relationship management aspect is not available in current systems, but could certainly be utilized in order to generate additional capital for the service providers available to the systems and as a result, provide additional compensation for the service provider systems. Generally, the system may keep a percentage of the fees paid to service providers for providing live advice and therefore directly benefit by having repeat customers.

Therefore, there remains a need to overcome one or more of the limitations in the above-described existing.

SUMMARY OF THE INVENTION

The present invention presents a method and apparatus for online advice customer relationship management. The method includes the determination of a service provider ID code from a requesting service provider. Once a service provider ID code is determined, a list of service seekers that have received advice regarding a field of service from a service provider corresponding to the service provider ID code is generated. Once generated, the listing of service seekers is displayed via customer display screen. As such, system administrators, as well as the service providers themselves, may view listings of service seekers in order to provide relationship management of the service seekers, such as for example, providing incentives to service seekers for follow-up live advice, as well as blocking undesired service seekers from further contact with the service provider.

The present invention provides many advantages over known techniques. The present invention includes the ability to enable service providers of service provider systems to track the various customers that have received advice communication from the various service providers. In doing so, the service providers may provide incentives to service seekers that have received advice from the service provider in order to induce repeat business. The service provider can also track service seekers and receive alerts from the system for initiating e-mail contact with service seekers that have expressed interest in engaging in repeat business. The customer relationship tool described herein enables service providers to track clients in order to generate follow-up business, which will provide increased compensation for the service providers and as a result, provide increased compensation for the service provider system, which collects a portion of the fees charged by the service providers for providing live advice regarding one or more fields of service.

BRIEF DESCRIPTION OF THE DRAWINGS

The present invention is illustrated by way of example, and not by way of limitation, in the figures of the accompanying drawings and in which:

FIG. 3 depicts a web page illustrating a customer management screen in accordance with a further embodiment of the present invention.

DETAILED DESCRIPTION

Figure 1:
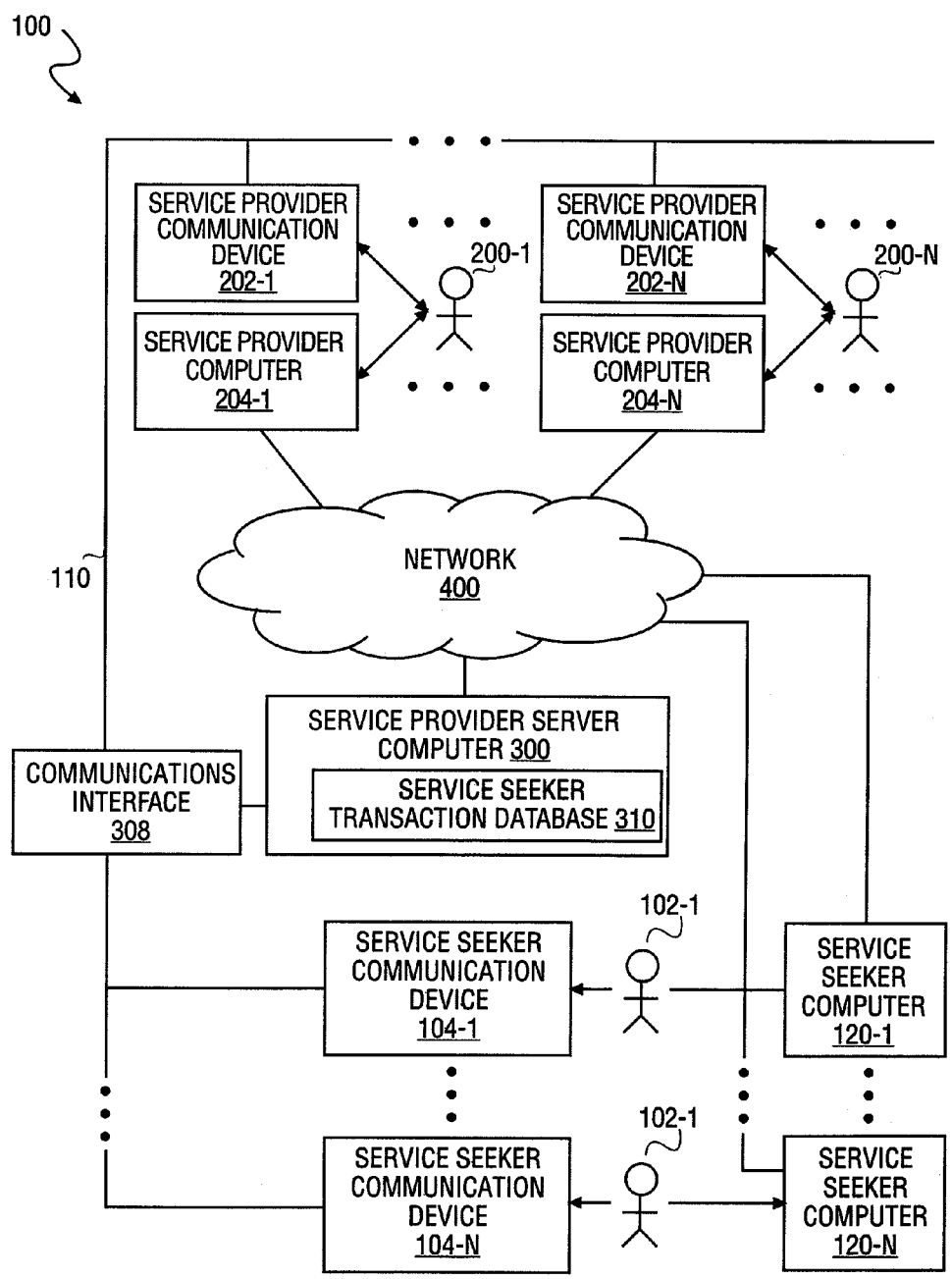
FIG. 1 depicts a block diagram illustrating a service provider system, including online advice customer relationship management in accordance with one embodiment of the present invention.

A method and apparatus for online advice customer relationship management are described. The method includes the determination of a service provider ID code from a requesting service provider. Once a service provider ID code is determined, a list of service seekers that have received advice regarding a field of service from a service provider corresponding to the service provider ID code is generated. Once generated, the listing of service seekers is displayed via a customer management screen. As such, system administrators, as well as the service providers themselves, may view listings of service seekers in order to provide relationship management of the service seekers, such as for example, providing incentives to service seekers for follow-up advice communication, as well as blocking undesired service seekers from further contact with the service provider.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System Architecture

FIG. 1 depicts one embodiment of a service provider system architecture 100 in which the systems and methods of the present invention may be incorporated. The service provider system 100 includes one or more service seeker computers 120 (120-1, . . . , 120-N) connected through a network 400 (such as an Intranet, an Extranet, a LAN or a WAN such as the Internet) to a host computer or web server ("service provider server computer") 300. One or more service provider computers 204 are also connected to the service provider server computer 300 via the network 400. Persons skilled in the art will recognize that the service provider server computer 300 may include one or more computers working together to provide the server computer functions described herein.

The system 100 also includes one or more service providers 200 (200-A, . . . , 200-N) each having a communications device 202 (202-1, . . . , 202-N) that is connected to a communications network 110. Accordingly, one or more service seekers (users) 104 (104-1, . . . , 104-N) access the service provider system via either communications devices 104 (104-A, . . . , 104-N) that are connected to the communications network 110 or service seeker computers 120. In accordance with the teachings of the present invention, a user 102 can send a request 106 (106-A, . . . , 106-N) via the communications device 104 or service seeker computer 120, which is received by the service provider server computer 300.

As described in further detail below, the service provider server computer 300 can then automatically connect the user 104 to a selected service provider 200 for a live conversation either via the communication devices 102 and 202 or the computers 120 and 204. Accordingly, when the request 106 is provided via a communication device 104, the request 106 may be in the form of either a voice command or keypad entry. As described in further detail below, the service provider server computer 300 can then connect the service seeker 102 to a selected service provider 200 for a live conversation via the communications/audio interface 308.

The communications network 110 generally refers to any type of wire or wireless link enabling the transmission of voice data such as, but not limited to, a public switched telephone network, a wireless communications network, a local area network, a wide area network or a combination of networks. The communications devices 104 and 200 generally refer to any type of device capable of receiving speech or keypad entry from a user and providing the speech/keypad entry to a destination via a communications network, such as the communications network 110. In an embodiment of the present invention, the communications network 110 is a public switched telephone network and the communications device 104 and 200 are telephones.

However, in contrast to service provider systems described in U.S. patent application Ser. No. 09/414,710 and U.S. patent application Ser. No. 09/702,217, service provider system 100, as depicted in FIG. 1, includes a service seeker transaction database 350. The service seeker transaction database contains a transaction record for each advice communication between a service seeker and a selected service provider. As will be described in further detail below, the advice communication may be in the form of a live advice conversation as described above, a recorded advice communication, as well as a written advice communication via, for example, electronic mail.

Accordingly, as each communication occurs between service seekers and service providers, a transaction record is generated in the service seeker transaction database 350 in order to enable customer management procedures, as will be described in further detail below, to provide service providers with listings of each service seeker that has received an advice communication from the service provider. As such, service providers, or system administrators, may view their respective service seekers (customers) via listings provided by customer management procedures, as will be described in further detail below.

Using the various procedures provided, the service providers can provide incentives to service seekers in order to induce the service seekers to engage in additional receipt of advice communication, thereby generating additional compensation to the service providers, as well as providing additional compensation to the service provider system 100. In addition, the customer management procedures provide further functionality for processing service seeker listings, as will be described in further detail below.

Figure 2A:
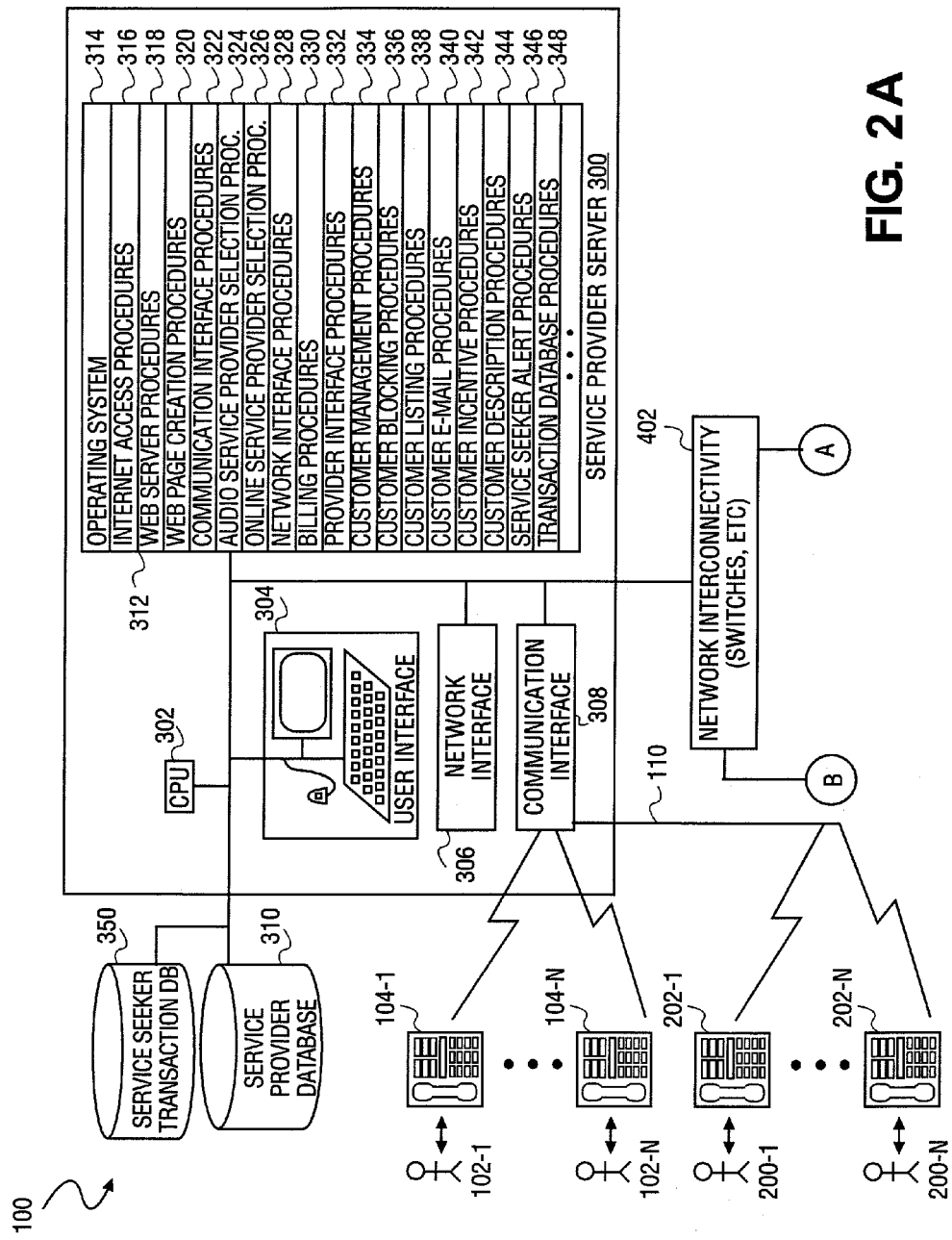
FIGS. 2A and 2B depict block diagrams further illustrating the service provider system as shown in FIG. 1.

Referring now to FIG. 2A, FIG. 2A further illustrates the service provider system 100, including the service provider server computer 300, as well as the service provider communication devices 202 and the service seeker communication devices 104 coupled to the communications interface 308. The service provider server computer 300 includes a central processing unit (CPU) 302, a user interface 304, a network interface 306, a communications interface 308, a service provider database (DB) 310, a service seeker transaction DB 350 and a memory 312. The service provider server computer 300 can be any type of computing device, such as, but not limited to, desktop computers, work stations, lap tops and/or mainframe computers.

The communications interface 308 is used to communicate with users 102 and service providers 200, as well as other system resources not shown. In one embodiment, the communications interface 308 receives an audio request 106 provided by user 102 through a communications 104, which is provided over the communications network 110. The communications interface 308 provides digitized voice requests to the audio portal server computer 300 for interactive voice recognition, including voice processing, speech recognition and text-to-speech processing. In addition, communications interface 308 provides digitized keypad responses to the service computer for decoding of dual tone multi-frequency (DTMF) signals.

The network interface 306 is used to connect a user computer 120 to a selected service provider computer 202 for real-time communication, such as voice over Internet Protocol (IP), video over-IP, or the like. The memory 312 of the service provider server computer 300 may be implemented as RAM (random access memory), SRAM (synchronous RAM), SDRAM (synchronous data RAM) or a combination of RAM and non-volatile memory, such as one or more memory modules, storage volumes, or magnetic disk storage units. The memory can contain any of the following:

an operating system 314;
internet access procedures 316;
web server procedures 318;
web creation procedures 320;
communications interface procedures 322 for receiving an audio request (voice/keypad entry) 106 from the user 102 via the communications interface 308 and utilizing either integrated voice recognition (IVR) for voice requests or dual tone multi-frequency (DTMF) decoding for keypad entry request to provide the user with a selected service provider and connect the service seeker 102 with the selected service provider 200 for a live conversation;

audio service provider selection procedures 324 for providing the service seeker 102 with keypad entry options for direct service provider connection by entering a service provider extension or browsing fields of service from an auditory list of fields of service providers provided by the system 100, including corresponding keypad entry codes, auditory lists of service providers matching a field of service selected by the user 102, as well as receiving various descriptors for narrowing the search of service providers, including acceptable price ranges, acceptable quality ratings, specific languages, as well as a service provider ID of a specific service provider when known by the service seeker 102;

online service provider selection procedures 324 for providing the service seeker 102 with an online interface for providing listing of fields of service available from the audio portal system 100, as well as receiving various descriptors for narrowing the search of service providers, including acceptable price ranges, acceptable quality ratings, specific languages, as well as a service provider ID of a specific service provider when known by the service seeker 102;

network interface procedures 326 for directing the network interface 306 to connect a user computer 1230 to a selected service provider computer 202 for real-time communication, such as voice over Internet Protocol (IP), video over-IP, or the like, once a service provider is selected;

billing procedures 330 for billing the service seeker 102 following an advice communication exchange with the service provider 200, as well as compensating the service provider 200 for the advice communication exchange and collecting a premium fee for the service provider system 100;

provider interface procedures 332 for providing an on-line interface, as well as an audio interface (e.g., via telephone), to service providers 200 requesting inclusion in the service provider database 310 in order to provide live services via the audio portal system 100 to perspective users 102;

allowing service providers 200 to update information in the service provider database 310, including times of availability;

customer management procedures 334 for providing a service provider, or system administrator, with a listing of service seekers which have received an advice communication from a respective service provider, the advice communication including live advice via communications devices 104 and 202 or voice and video over-IP via computers 120 and 204, recorded advice and written advice, to enable service seekers to perform customer relationship management of service seekers, including providing incentives for repeat business, customer lists, as well as blocking selected service seekers from future advice communications;

customer blocking procedures 336 for receiving a selection for one or more service seekers and blocking the selected service seekers from receipt of future advice communications from the service provider;

customer listing procedures 338 for generating customer lists created by the service provider and placing selected service seekers within the customer listings generated by the service provider;

customer e-mail procedures 340 for enabling the generation of an e-mail to one or more service seekers selected by the service provider to provide, for example invitations, as well as incentives to the selected service seekers, in order to entice the service seekers to receive future communications advice from the selected service provider;

customer incentive procedures 342 for providing communication incentives to service seekers, which have engaged in repeat receipt of advice communications from a selected service provider in response to received communication incentives via, for example e-mail, including, for example, free minutes, cash prizes or the like;

customer description procedures 344 utilized by the customer listing procedures 338 in order to enable a service provider to enter comments regarding one or more selected service seekers describing, for example, communication notes gathered by the service provider during advice communications with the one or more service seekers;

service seeker alert procedures 346 for notifying a service provider to initiate contact with the selected service seekers in order to provide the designated service seekers with communication incentives and invitations for follow-up advice communications therebetween;

transaction database procedures 348 for generating a transaction record within the transaction database 350 for each advice communication between a service provider and a service seeker, as well as accessing the transaction database at the request of the customer management procedures 334 in order to select a list of service seekers that have received advice communications from a respective service provider; and other procedures and files.

Figure 2B:
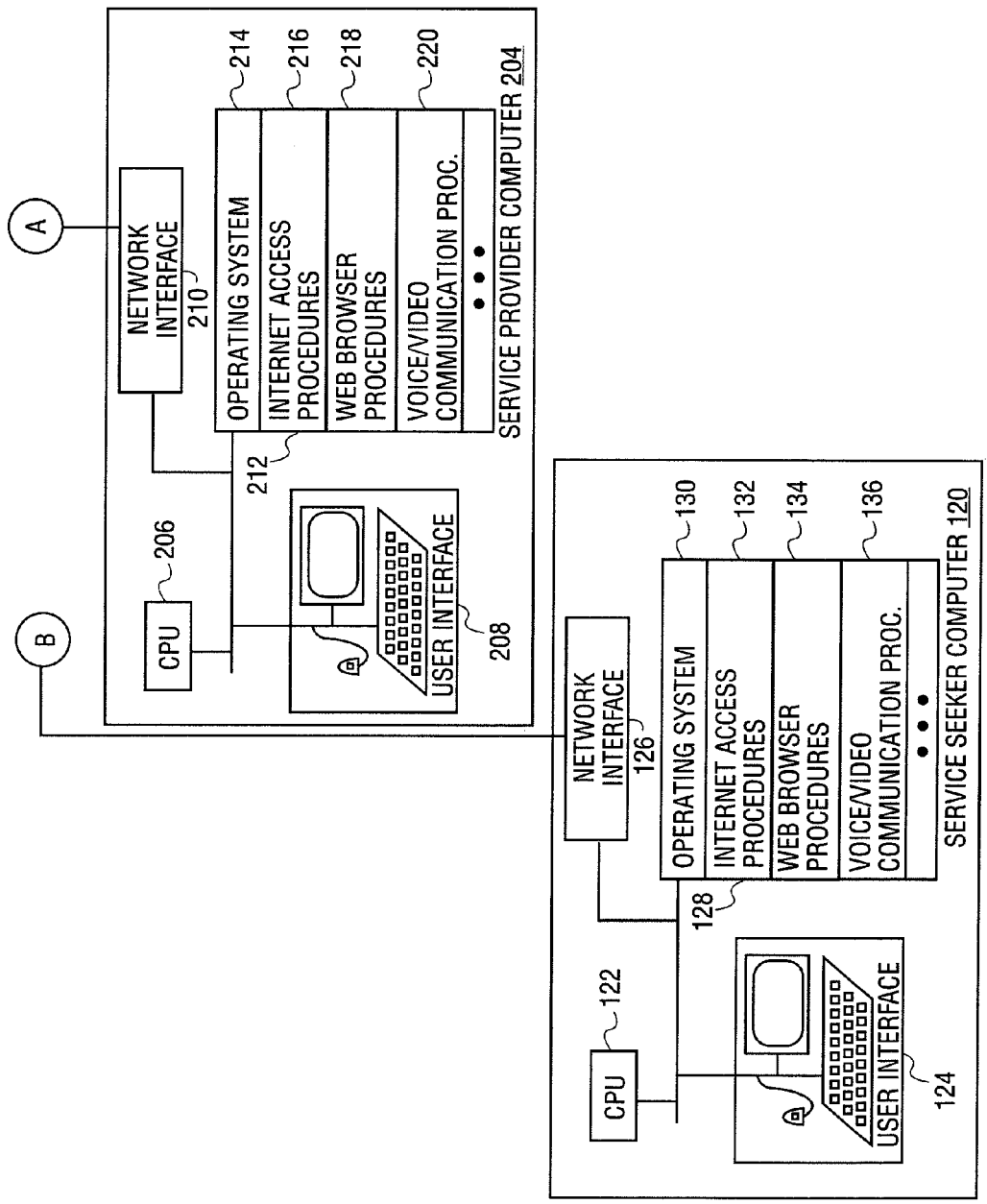

FIG. 2B illustrates the service seeker computer 120, which includes a CPU 122, a user interface 124, a memory 128 and a communications interface 126. The communications interface 126 is used to communicate with the service provider server computer 300, as well as other system resources not shown. Additionally, the service seeker computer may include a microphone as well as a digital video camera, utilized by voice/video procedures 136, for enabling voice over-IP or video over-IP communication between a user 102 and a selected service provider 200.

The memory 128 of the service seeker computer 120 may be implemented as RAM (random access memory) or a combination of RAM, SRAM (synchronous RAM), SDRAM (synchronous data RAM) and non-volatile memory, such as one or more memory modules, storage volumes, or one or more magnetic disk storage units. The memory 128 can contain the following:

an operating system 130;
internet access procedures 132;
web browser procedures 134 for accessing online applications, such as service provider computer 300;
voice/video communication procedures 136 for enabling voice over-IP or video over-IP communication between a user 102 and a selected service provider 200; and
other procedures and files.

FIG. 2B also illustrates the service provider computer 202, which includes a CPU 204, a user interface 206, a memory 210 and a communications interface 208. The communications interface 208 is used to communicate with the voice portal server computer 300, as well as other system resources not shown. Additionally, the service provider may include a microphone as well as a digital video camera, utilized by voice/video communication procedures 220, for enabling voice over-IP or video over-IP communication between a user 102 and a selected service provider 200.

The memory 210 of the service provider computer 202 may be implemented as RAM (random access memory) or a combination of RAM and non-volatile memory, such as SRAM (synchronous RAM), SDRAM (synchronous data RAM) and one or more magnetic disk storage units. The memory 210 can contain the following:

an operating system 212;
internet access procedures 214;
web browser procedures 216 for accessing online applications, such as service provider computer 300;
voice/video communication procedures 216 for enabling voice over-IP or video over-EP communication between a user 102 and a selected service provider 200; and
as well as other procedures and files.

The embodiments depicted in FIGS. 2A and 2B include a service provider database 310 containing information about a wide array of service providers 200. In order to present themselves to their potential clients (service seekers), service providers 200 list themselves in this database 310. In one embodiment, this is done through the use of an Internet web site, via web pages (not shown) provided by the service provider interface procedures 332. The service provider 200 registers his/her name and phone number using the web page, along with a description of the service that he/she offers. The description includes key words describing the field of service. The description also includes a price for rendering the service, most commonly, but not restricted to a per-minute price.

The service provider 200 then informs the system 100 of the times when he/she is available to receive calls. Switching service provider 200 availability status can be done online or through a communications device, such as a telephone. Once the database 310 contains the phone numbers of service providers, descriptions of their services, their prices, and their real-time availability statuses, the audio portal system 100 can provide services to users 102 desiring corresponding services.

In one embodiment a telephone is used as part of the delivery mechanism or communications device 104 and 202 of the system 100. A user 102 seeking services (service seekers) dials a central telephone number and then listens to a series of options, including entry of verification information, such as a personal information number (PIN) code. The seeker can select keypad request or voice request to indicate the type of service he would like to receive by speaking the name of a profession, such as "psychiatrist," which is processed by the system's audio interface 308 using audio interface procedures 322.

In an alternate embodiment, the service seeker 102 can listen to a series of professions and press the numerical keypad to select one by selecting a field of service browse option. Accordingly, the system accepts keypad or voice response from a service seeker 102 and continues until the desired field of service is selected. In addition, when known, the service seeker 102 can select a direct connection and provide a service provider ID (telephone extension) of a desired service provider for immediate connection with the selected service provider (as described above).

Once the user 102 has indicated a field of service using the service provider selection procedures 324/326, the system 100 searches its database 310 for service providers in that field. The service provider selection procedures 324/326 allow the user 102 to further narrow the search for a service provider 200 by speaking—or pressing into the telephone keypad—a price, such as "50 cents per minute." The server computer 300 will then narrow the search in the database 310 for service providers 200 that match the price range.

The service seeker 102 can further narrow the search for a service provider 200 by speaking—or pressing into the telephone keypad—a quality rating, such as "three stars or higher." The server computer 300 will then narrow the search in the database 340 for service providers 200 which match the quality rating range. Finally, the user 102 can further narrow the search for a service provider by speaking—or pressing into the telephone keypad—the name of a language, such as "Spanish." The server computer 300 will then narrow the search in the database 310 for service providers 200 who can speak this language.

Once converted, the service provider selection procedures 324 will query the service provider database 310 using the user selection in order to provide either service providers within a field of service selected by the user or corresponding service provider selected by the user. Accordingly, in certain embodiments, prior users may enter a service provider code number for immediate connection to the service provider. Accordingly, the seeker can avoid delays provided via interface prompts required by new users in order to familiarize users with the fields of service available from the audio portal system 100. In one embodiment, if the service provider is not available, the seeker is given the option to connect with the highest rated service provider within the corresponding category. As such, the service provider selection procedures 324/326 include both IVR software, as well as DTMF decoding software, depending on whether the user's responses are provided as voice responses or keypad entry.

Once a service provider 200 with the desired characteristics has been chosen, the audio portal system 100 will automatically connect the service seeker 102 with the selected service provider 200, assuming the service provider is available. Once both the service seeker 102 and provider 200 are on the phone line 110, the system 100 conferences the two phone calls together, enabling services to be rendered in a live conversation. The system keeps track of the time spent on the phone call using the conversation monitoring procedures 340. The service seeker 102 is then billed accordingly, and the funds are transferred to the provider 200 using the billing procedures 328. In addition, a transaction record is generated within the transaction by using the transaction DB procedures 348.

Referring now to FIG. 3, FIG. 3 depicts a block diagram illustrating a customer management screen 500 in accordance with one embodiment of the present invention. The customer management screen 500 is generated using the customer management procedures 334 in response to selection of a customer management link within, for example, a service provider management page (not shown). As indicated, the customer management screen 500 includes a listing of service providers 520 that have received advice communications from the respective service provider.

As described above, the advice communications may be in the form of a live advice communication via a communications device, such as a telephone, as indicated by col. 530, as well as recorded advice communications, as indicated by col. 532, and written advice communications, as indicated by col. 534. In addition, the listing includes the last contact date with the respective service seeker, as indicated by col. 536, as well as a total earnings col. 538, and a customer type col. 540. In addition, the customer management screen 500 provides a service provider with one or more options.

In the embodiment depicted, the service provider is provided with a compose e-mail option 506, a block option 508 and assign to list option 510. In order to use the provided options, a service provider will select checkboxes, indicated at col. 522, by for example, mouse clicking on the various checkboxes corresponding to desired service seekers. Once selected, the service provider can click on an option. Once the option is selected by the service provider, the customer management procedures 334 will process the selected service providers according to the selected option. When a service provider selects the compose e-mail option 506, the customer e-mail procedures 340 are performed.

In one embodiment, the procedures 340 provide the service provider with an electronic mail generation screen in order for the service provider to enter desired information within the electronic mail. Once entered, the electronic mail will be sent to the selected service seekers. The electronic mail option may be utilized by service providers in order to provide incentives to the selected service seekers in order to entice the service seekers to engage the service providers' assistance in the form of an advice communication. When a service seeker responds to a communication incentive, the customer incentive procedures 342 will compensate the service seeker once the advice communication is complete.

Figure 6:
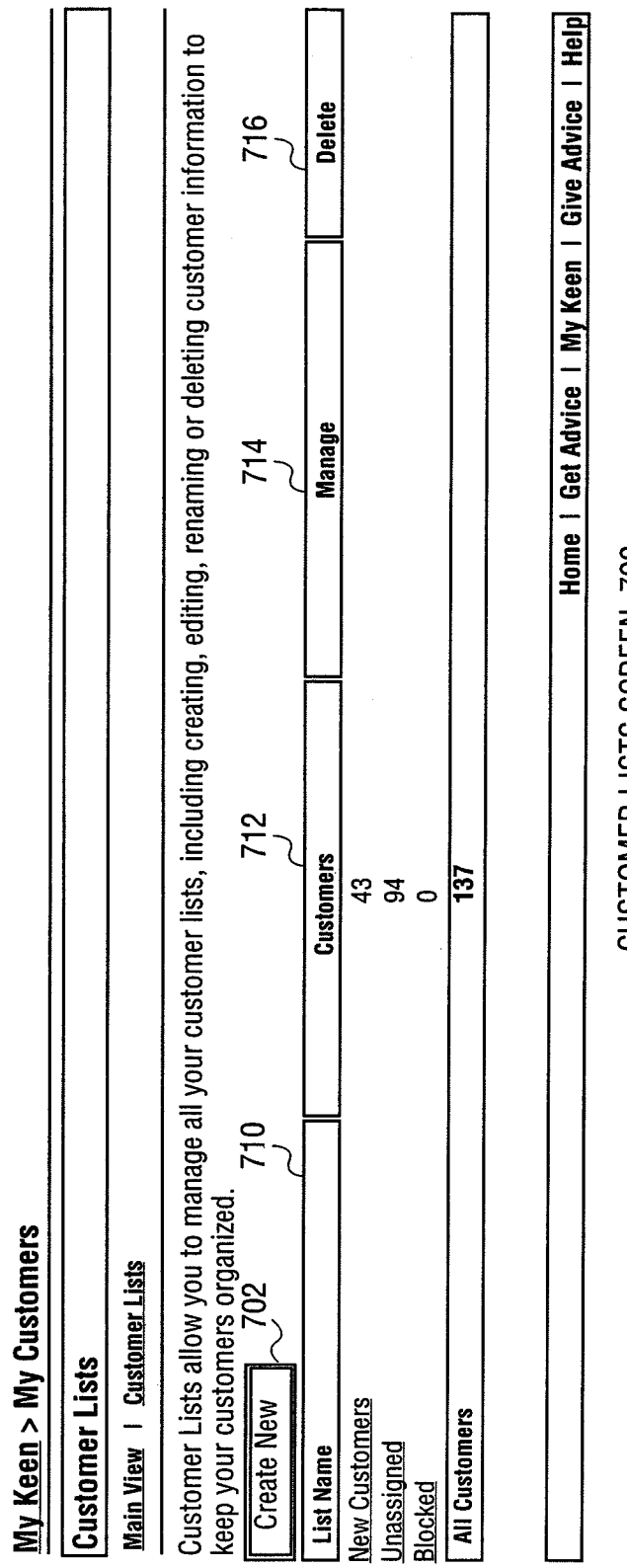
FIG. 6 depicts a web page illustrating a customer list screen in accordance with an exemplary embodiment of the present invention.

The block option 508 enables a service provider to select one or more of the service seekers within the list 520. Once selected, the block option 508 will invoke customer blocking procedures 336, which will prohibit the selected service seekers from engaging in future receipt of advice communications from the service provider. This is a very valuable feature for service providers that have encountered undesirable service seekers and would much rather prevent and avoid future contact with the undesirable service seekers. Finally, the assign to list option 510 invokes the customer listing procedures 338 to enable to the service provider to select one or more of the service seekers and to assign the service seekers to various lists, as depicted in FIG. 6, utilizing customer list screen 700.

Figure 4:
FIG. 4 depicts a web page illustrating a customer detail screen in accordance with a further embodiment of the present invention.

Referring now to FIG. 4, FIG. 4 depicts a customer detail screen 600, which is generated by the customer management procedures 334, when the user clicks on a service seeker from service seeker list 520. The customer detail screen will include the member name 602 and when necessary, an alert 604, as well as options for responding to the alert, such as sending Keen mail 608 and sending an invitation 610. The service seeker alert procedures 346 are utilized in order to alert service providers of service seekers that have expressed interest in additional receipt of advice communication. Accordingly, the indicated service seekers should be contacted in order to entice the service seekers to engage the service provider for additional advice communications.

In one embodiment, alerts are generated for service seekers based on a total earnings amount from the service seeker, ratings received from the service seeker, as well as a last contact date from or with the respective service seeker. As indicated, the customer detail screen will include a contact summary 620, which will include a total earnings amount, average feedback given, type of contact, amount earned, number of contracts, number of minutes, last contact (in days). Finally, a contact screen 630 will include a type of contact with the user 634, as well as the date. The contact screen 630 also includes a note portion for the service provider to enter notes with regard to the respective service seeker.

Figure 5:
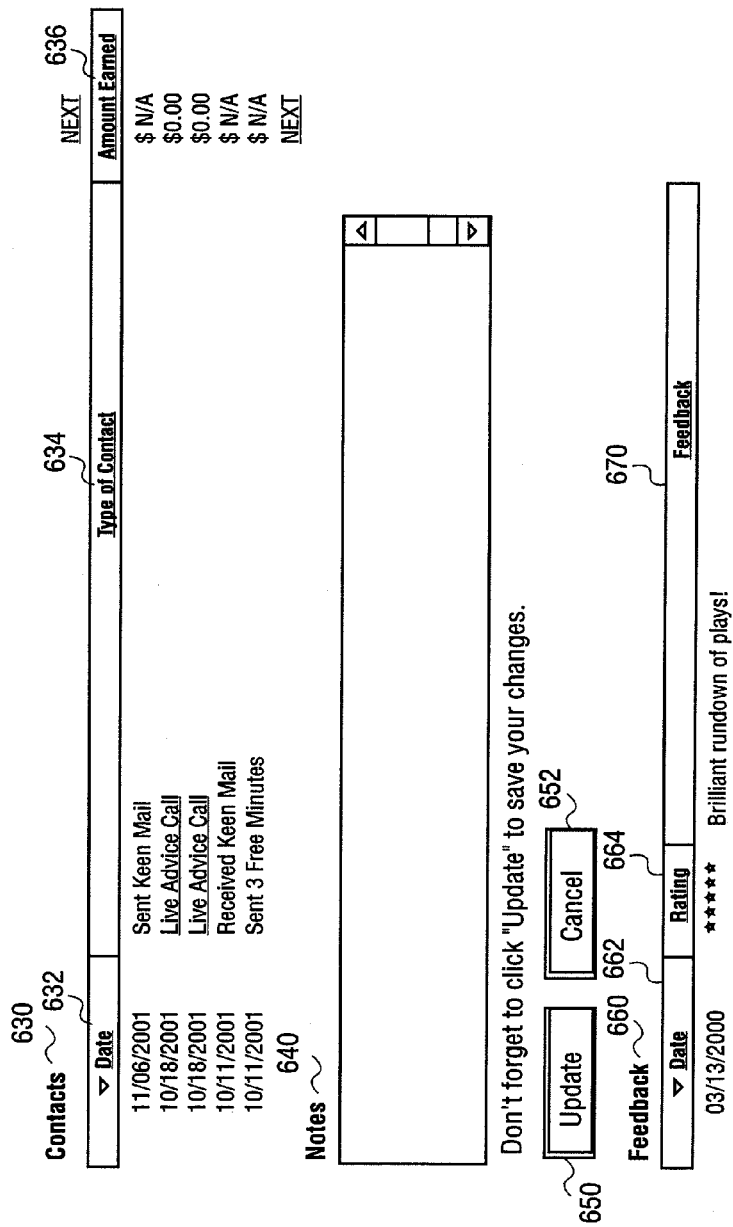
FIG. 5 depicts a web page illustrating a customer contact screen in accordance with a further embodiment of the present invention.

Referring now to FIG. 5, FIG. 5 depicts a customer contact screen 630, as depicted in FIG. 4. The customer contact screen 630 allows the service provider to enter notes regarding a respective service seeker, as well as viewing the type of contact with the service seeker 634, as well as an amount earned from the service seeker. Such notes may be utilized during future advice communications with the respective service provider in order to provide improved advice communications therewith.

Finally, referring to FIG. 6, FIG. 6 depicts customer list screen 700, which may include the names of the various lists generated by the service provider. By default, the customer list will automatically include a new customers list, an unassigned customers list, as well as a block customers list. Procedural methods for describing and implementing the customer relationship management features described herein are now provided.

Operation

Figure 7:
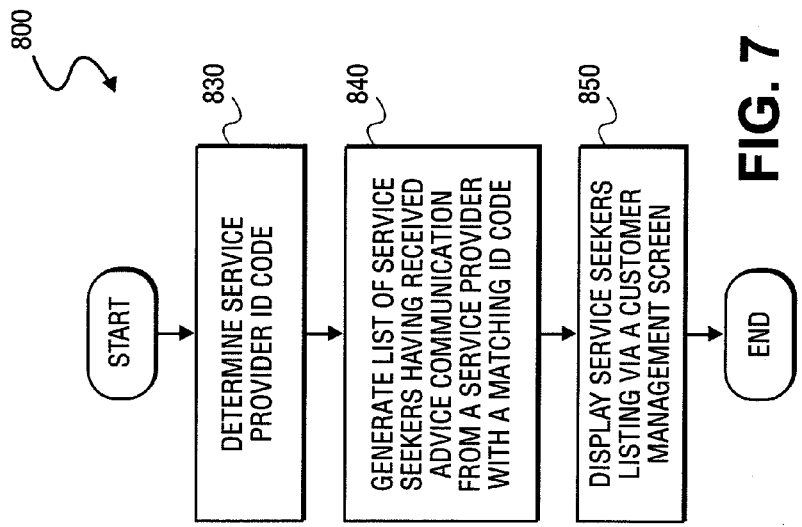
FIG. 7 depicts a flowchart illustrating a method for online live advice customer relationship management in accordance with one embodiment of the present invention.

Referring now to FIG. 7, FIG. 7 depicts a flowchart illustrating a method 800 for online advice customer relationship management within a service provider system, such as for example system 100, as depicted in FIGS. 1 through 2B. As such, the method described enables service providers to track customers, or service seekers, that have received advice communications from the service provider via e-mail, recorded advice or live advice communication via communication devices, such as standard telephones. Utilizing the methods described herein, a service provider can keep track of the various customers that have been provided advice communications via listings of the various customers, or service seekers.

Using the listings, the service provider can select customer management options, as will be described in further detail below, as well as providing incentives to previous customers in order to entice the customers to engage in repeat receipt of advice communications from the service provider. Accordingly, virtually any system that provides live advice via communications devices, such as telephones or online advice via voice or video over-IP, as well as recorded information, can keep track of its customers. In addition to customer tracking, the method enables providing of customers with incentives in order to generate repeat business, which will result in increased compensation for the various providers and, in effect, generate additional compensation for the systems which provide these advice communications.

The online advice customer management method 800 begins at process block 830, wherein a service provider ID code is determined. Once the service provider ID is determined, a list of service seekers that have received advice communications regarding a field of service from the service provider are generated. In one embodiment, this listing is generated using customer management procedures 334 by selecting service seekers that have received advice communications from a service provider corresponding to the service provider ID code determined at process block 830. Finally, at process block 850, the listing of service seekers is displayed via a customer display screen, such as depicted in FIG. 3. Once displayed, the service seeker can perform relationship management of the listed service seekers in order to provide, for example repeat advice communication incentives, customer list management, as well as blocking customers from repeat receipt of advice communications.

Figure 8:
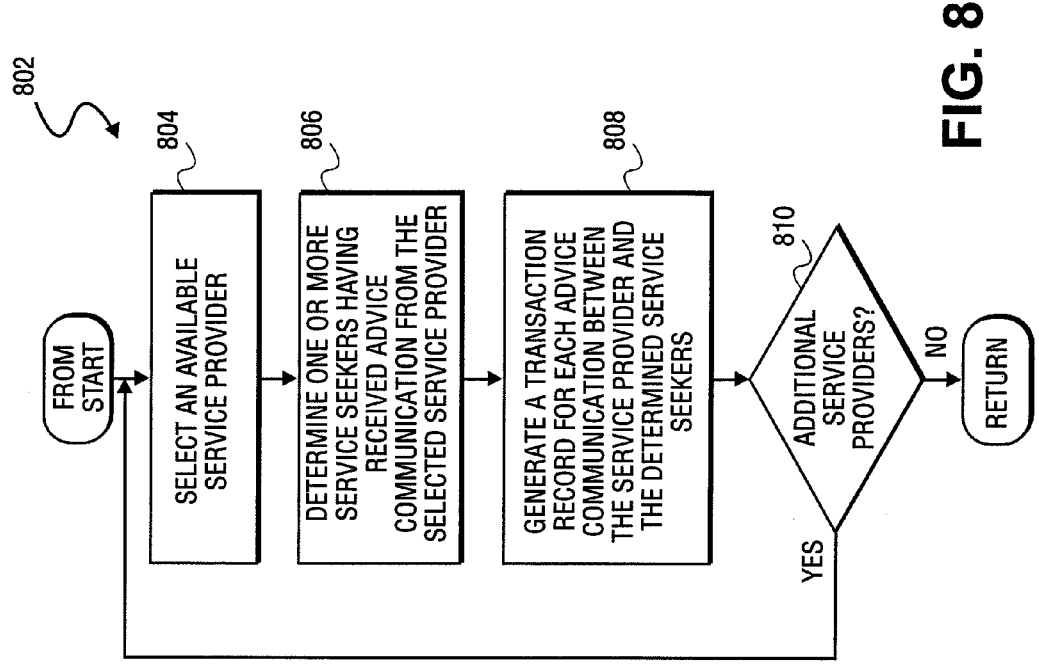
FIG. 8 depicts a flowchart illustrating an additional for generating transaction records in order to enable online customer relationship management in accordance with a further embodiment of the present invention.

Referring now to FIG. 8, FIG. 8 depicts a flowchart illustrating an additional method 802, which is performed prior to determining of the service provider ID code at process block 830. At process block 804, a service provider is selected from a service provider system, such as for example the service provider system as depicted in FIGS. 1 through 2B. Once selected, at process block 806, one or more service seekers are determined that have received advice communications regarding a field of service from the selected service provider. Next, at process block 808, a transaction record is generated within a service seeker transaction database 350 for each determined service seeker.

In one embodiment, this is performed using the transaction database procedures 348. Finally, at process block 810, process block 804 through 808 are repeated for each service provider available from the service provider system 100. Accordingly, for each advice communication engaged between a service seeker and a service provider, the system 100 will generate a corresponding transaction record in order to enable the customer relationship management process as described herein.

Figure 9:
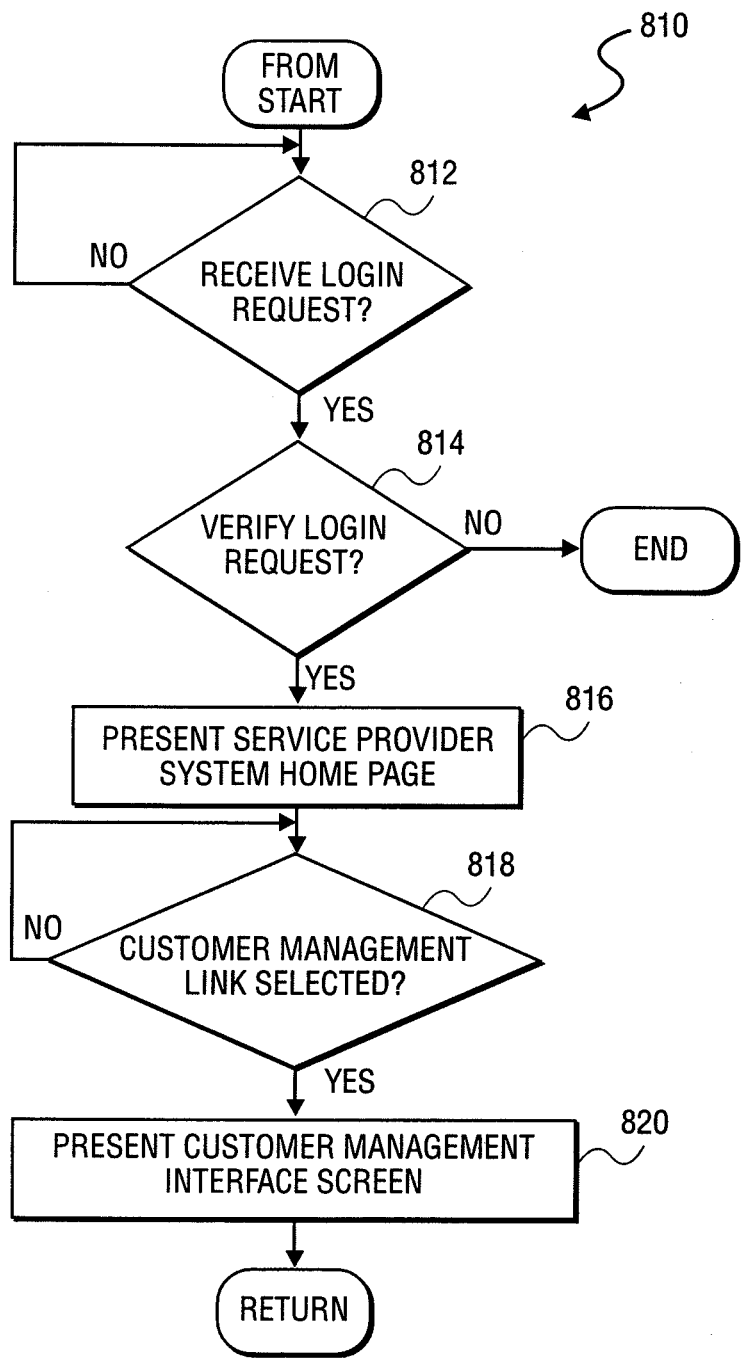
FIG. 9 depicts a flowchart illustrating a method for enabling a service seeker to engage the online customer relationship management system in accordance with a further embodiment of the present invention.

Referring now to FIG. 9, FIG. 9 depicts a flowchart illustrating an additional method 810, which is performed prior to determination of the service provider ID code at process block 830. At process block 812, it is determined whether a login request is received. Once the login request is received, at process block 814, it is determined whether a service provider password corresponds to the service provider ID contained within the login request. Assuming the service provider is verified, process block 816 is performed. Otherwise, the procedure terminates. Once verified, at process block 816, the service provider is presented with a service provider system homepage. Next, at process block 818, it is determined whether the service provider has selected a customer management link. Once the service provider selects the customer management link, process block 820 is performed. At process block 820, the service provider is presented with a customer management interface screen 500, for example as depicted in FIG. 3.

Figure 10:
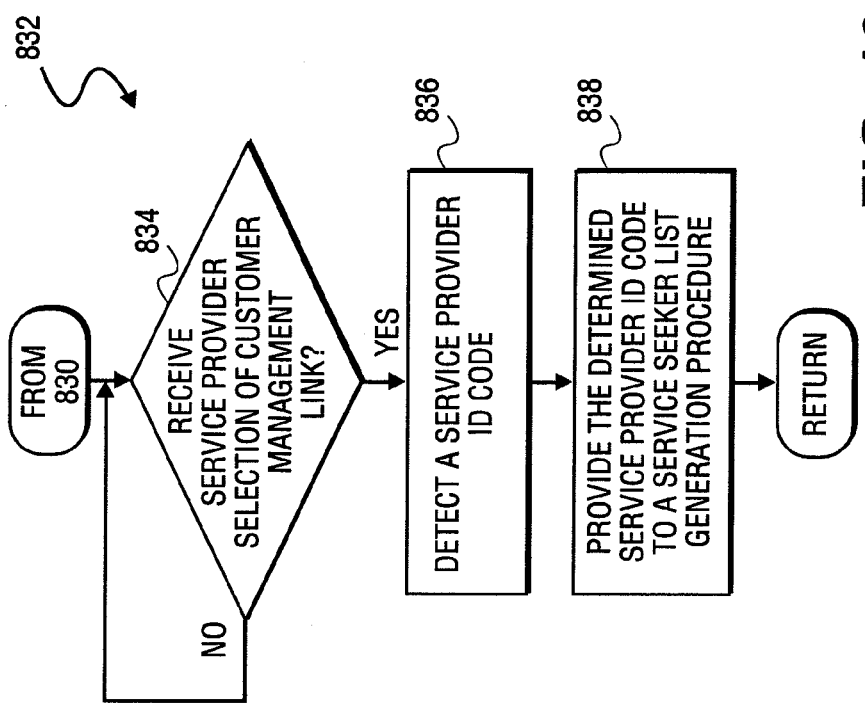
FIG. 10 depicts a flowchart illustrating an additional method for determining a service provider ID code of a service provider in accordance with the further embodiment of the present invention.

Referring now to FIG. 10, FIG. 10 depicts a flowchart illustrating an additional method for determining the service provider ID code of process block 830, as depicted in FIG. 7. At process block 834, it is determined whether a service provider selection of a customer management link is received. Once received, at process block 836, a service provider ID code of the service provider is detected. Finally, at process block 838, the determined service provider ID code is provided to a service seeker list generation procedure, such as for example customer management procedure 334, as depicted in FIG. 2A.

Figure 11:
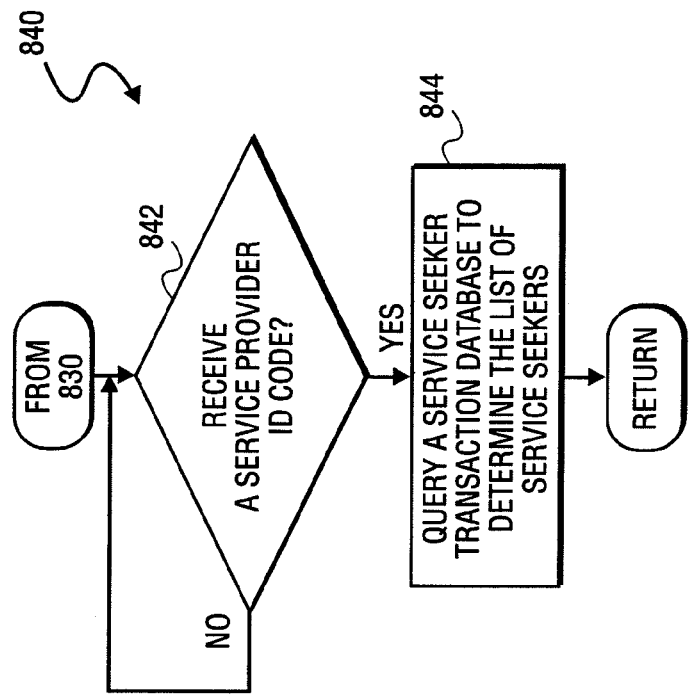
FIG. 11 depicts a flowchart illustrating an additional method for generating a list of service seekers having received advice communication from a respective service provider in accordance with a further embodiment of the present invention.

Referring now to FIG. 11, FIG. 11 depicts a flowchart illustrating an additional method 842 for generating the listing of service seekers of process block 840, as depicted in FIG. 7. At process block 842, it is determined whether a service provider ID code is received. Once the service provider ID code is received, a service seeker transaction database 350 is queried to determine the list of service seekers having received advice communications from a service provider matching the service provider ID code. Querying of the service seeker transaction database 350 is performed using, for example the transaction database procedures 348, and will include a listing of service seekers that have received advice communications via a communications medium, such as a telephone, recorded advice and written advice, via, for example, electronic mail.

Figure 12:
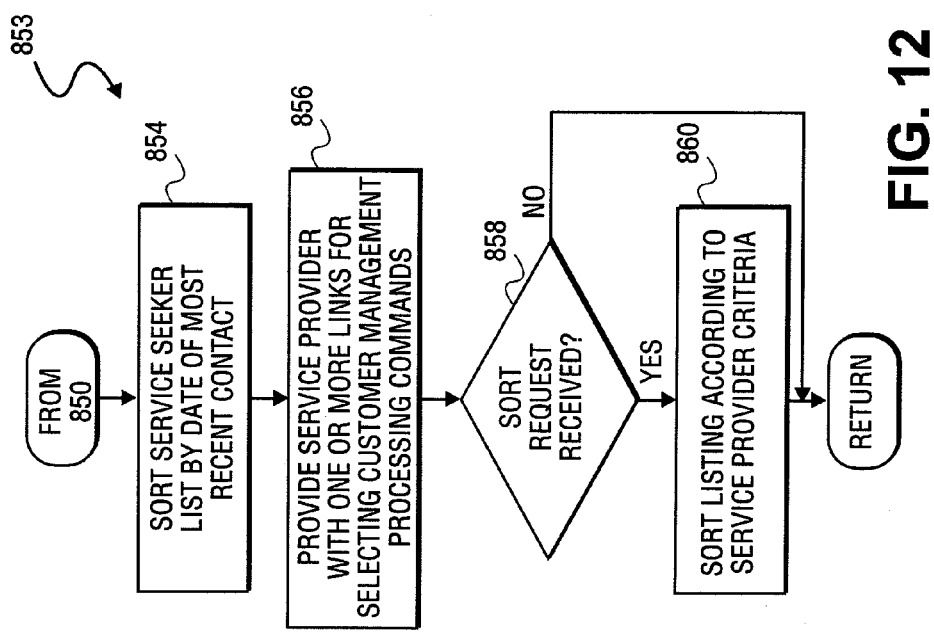
FIG. 12 depicts a flowchart illustrating an additional method for displaying a listing of service seekers via customer display screen in accordance with a further embodiment of the present invention.

Referring now to FIG. 12, FIG. 12 depicts a flowchart illustrating an additional method 852 for displaying the listing of service seekers of process block 850, as depicted in FIG. 7. At process block 854, the list of service seekers is sorted according to a data of most recent contact with the corresponding service provider. Next, at process block 856, a user, such as for example the service provider or a system administrator, is provided with one or more links for selecting customer management processing commands. The customer management processing commands are utilized for processing one or more selected service seekers contained in the listing, for example as depicted in FIG. 3.

In one embodiment, the customer management processing commands include e-mail generation options, customer blocking options and list generation options, which are provided using procedures 336 through 342, as depicted in FIG. 2A. At process block 858, it is determined whether a sort request is received from the user, such as for example, by clicking one of the columns, as depicted in FIG. 3A. When a sort request is received, at process block 860, the listing is sorted according to criteria provided by the service provider.

Figure 13:
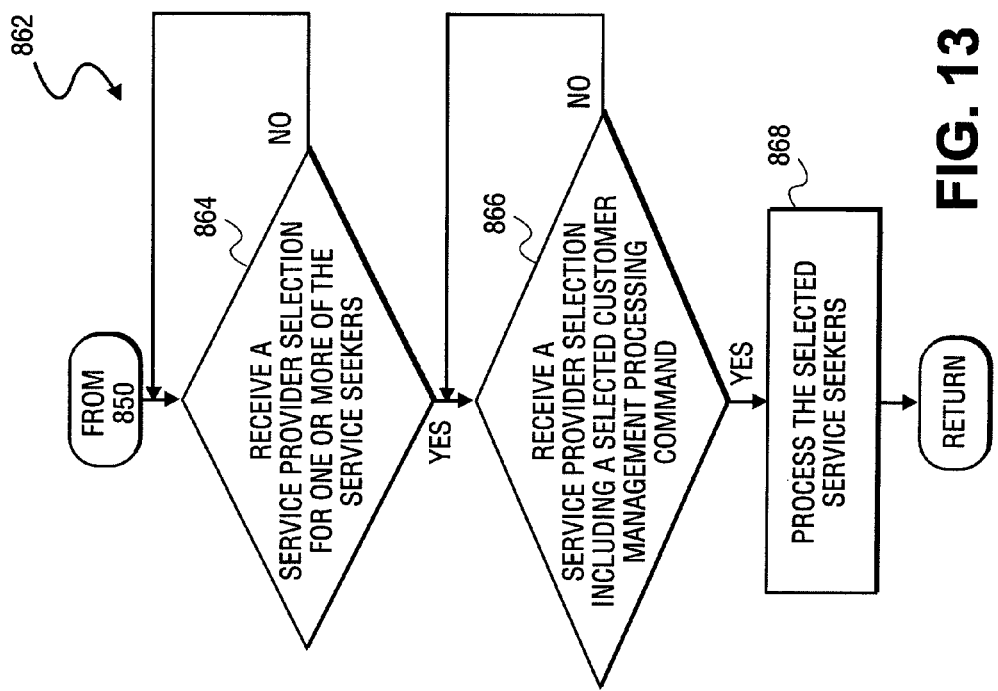
FIG. 13 depicts a flowchart illustrating an additional method for processing selected service providers within a display listing in accordance with an exemplary embodiment of the present invention.

Referring now to FIG. 13, FIG. 13 depicts a flowchart illustrating a method 862 for processing a service seeker listing utilizing one or more of the customer management options, as depicted in FIG. 3. At process block 864, a service provider selection is received for one or more of the service seekers contained in the service seeker display screen 500, as depicted in FIG. 3. Next, at process block 866, a service provider selection for a customer management processing command is received. Finally, at process block 868, the selected service seekers are processed according to the selected customer management processing command.

Figure 14:
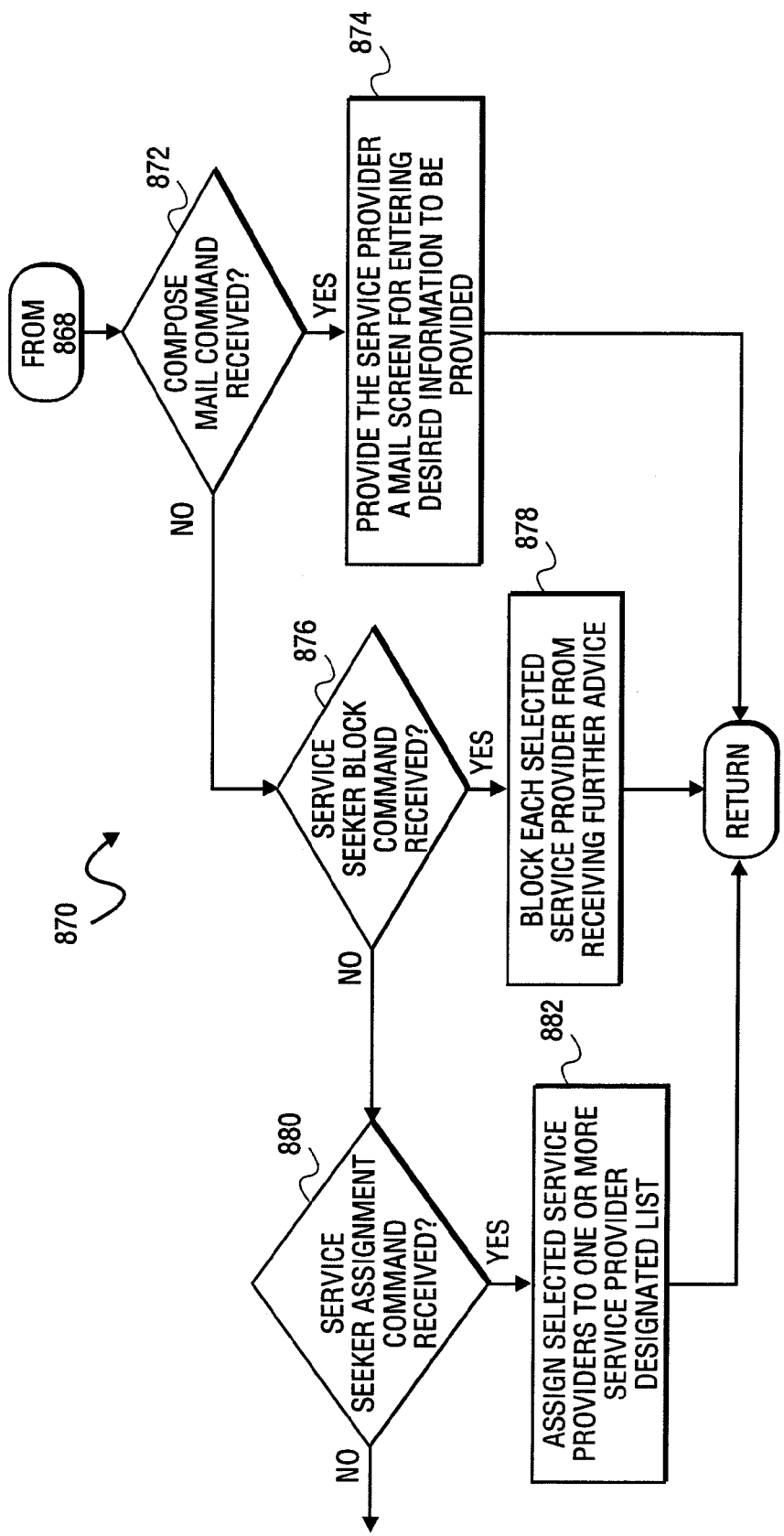
FIG. 14 depicts a flowchart illustrating an additional method for processing selected service seekers in accordance with a selected customer management processing command in accordance with an exemplary embodiment of the present invention.

Referring now to FIG. 14, FIG. 14 depicts a flowchart illustrating an additional method for processing the selected service providers of process block 868, as depicted in FIG. 13. At process block 872, it is determined whether a compose mail command is received. When a compose mail command is received, at process block 874, the service provider is provided with a mail screen for entering in desired information to be provided to each of the selected service providers via electronic mail. Otherwise, at process block 876, it is determined whether a service seeker block command is received.

When a service seeker block command is received, at process block 878, each selected service provider is blocked from receiving further advice communications from the service provider, utilizing for example, the customer blocking procedures 336, as depicted in FIG. 2A. Finally, at process block 880, it is determined whether a service seeker assignment command is received. When a service seeker assignment command is received, at process block 882, the selected service providers are assigned to one or more lists generated by the service provider, utilizing for example the customer linking procedures 338, as depicted in FIG. 2A.

Figure 15:
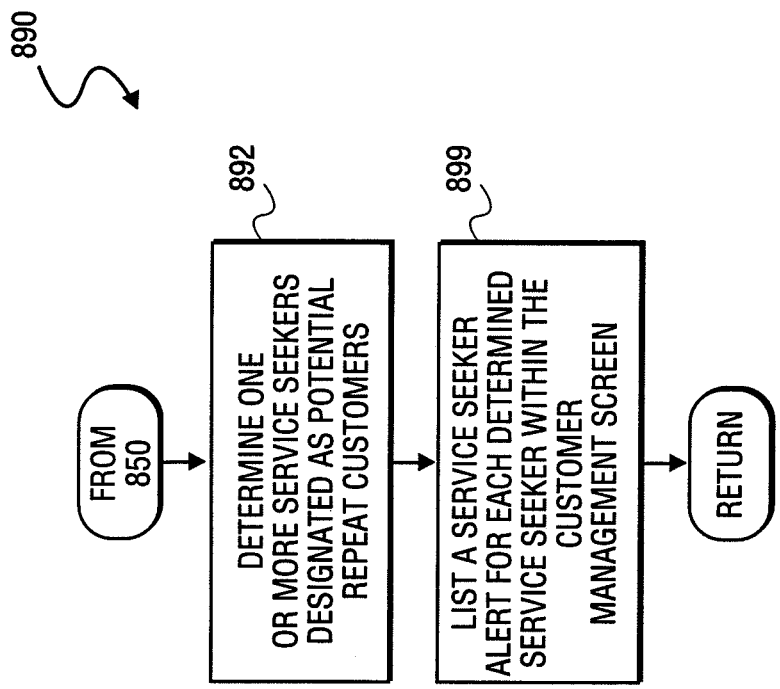
FIG. 15 depicts a flowchart illustrating a method for providing a service provider with a listing alert for one or more service seekers designated as potential repeat customers in accordance with an exemplary embodiment of the present invention.

Referring now to FIG. 15, FIG. 15 depicts an additional method 850 for providing the list of service seekers at process block 850, as depicted in FIG. 7. At process block 892, one or more service seekers are determined from the customer management screen 500, which are designated by the service provider system as potential repeat customers according to predetermined criteria. In one embodiment, the predetermined criteria may include a day of last contact, a total earnings received from the various service seekers, as well as determination of any e-mail contact received by the service provider from the service seeker.

Once determined, at process block 894, an alert is listed via the customer management screen 500, as well as via the customer detail screen 600, as depicted in FIG. 4, for each of the determined service seekers at process block 892. For example, as depicted in FIG. 4, the service provider will be provided with the member name 602, an indication for urgent follow-up 604, an option to send Keen mail 608 or send an invitation 610 in order to alert the service seeker to contact the service provider for further receipt of advice communications. Accordingly, the service provider may, via the e-mail option, send service seekers, which are indicated under service seeker alerts, with incentive compensation for repeat receipt of advice communications, utilizing for example, the service seeker alert procedures 346, as depicted in FIG. 2A.

Figure 16:
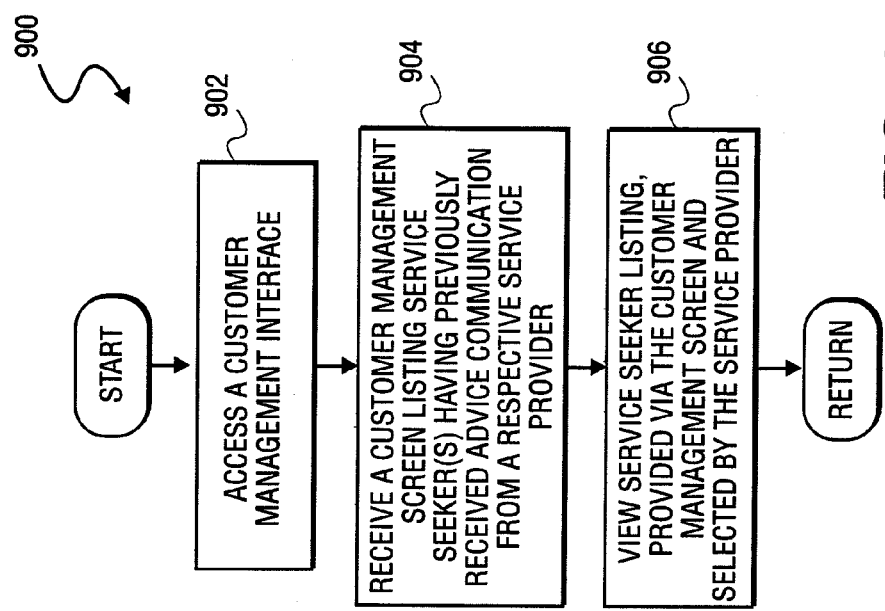
FIG. 16. depicts a flowchart illustrating a method for performing online customer relationship management of service seeker customers of a respective service provider in accordance with one embodiment of the present invention.

Referring now to FIG. 16, FIG. 16 depicts a method 900 for utilizing online advice customer relationship management provided via a service provider system, for example as depicted in FIGS. 1 through 2B, by either a service provider or a system administrator of the service provider system 100. At process block 902, a customer relationship management portion of the service provider system is accessed by a service provider. Once accessed, at process block 904, the service provider receives a customer display screen, such as for example customer management screen 500, as depicted in FIG. 3. As illustrated, the customer management screen 500 will include a listing of one or more service seekers that have received advice communications regarding a field of service from the service provider.

Finally, at process block 906, the service provider views the listing of service seekers that is processed according to one or more customer management processing options, which are provided via the customer management screen 500, as depicted in FIG. 3, and selected by the service provider. Accordingly, as depicted in FIG. 3, the service provider may select either the compose e-mail option 506, the block option 508 or the assignment to list option 510. However, it should be recognized that the customer management screen 500 is provided for illustration purposes only and should not be construed in a limiting sense. As such, those skilled in the art will appreciate that various additional customer relationship processing commands may be included and provided via online interfaces, such as the customer management screen 500.

Figure 17:
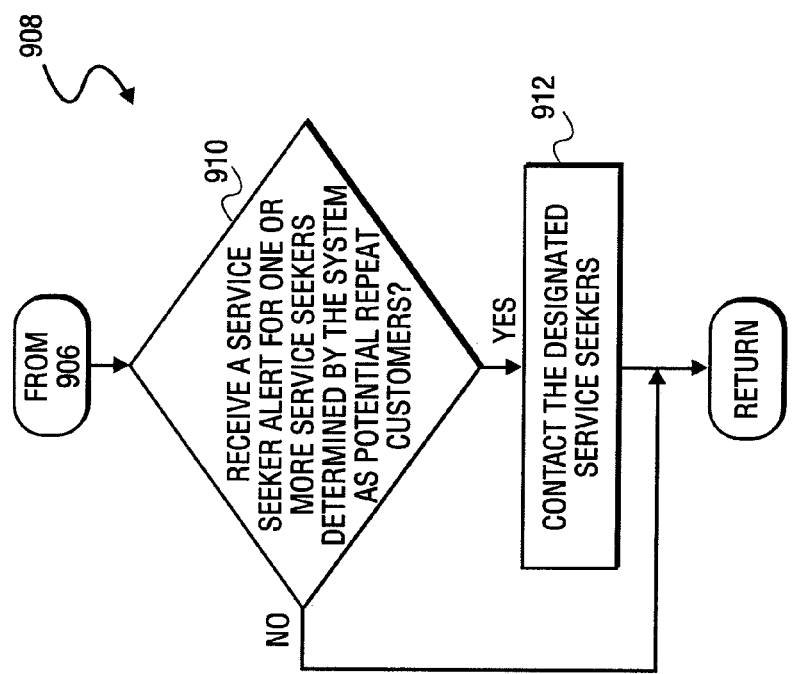
FIG. 17 depicts a flowchart illustrating an additional method for receiving a service seeker alert by a respective service provider in accordance with one embodiment of the present invention.

Referring now to FIG. 17, FIG. 17 depicts an additional method 908 for viewing the listing of service seekers of process block 906, as depicted in FIG. 16. At process block 910, it is determined whether a service seeker alert is received, via for example the customer management screen 500. When a service seeker alert is received, at process block 912, the service provider is provided with the option of contacting the designated service seekers in order to provide, for example incentives for repeat business and engagement in advice communication with the service provider. In one embodiment, the customer service alert procedures 346 will provide, in conjunction with the customer management procedures 344, a customer detail screen, which will list the alert 604 along with options for sending e-mail 608, as well as sending the selected service seekers an invitation for engagement in advice communication with the service provider.

Figure 18:
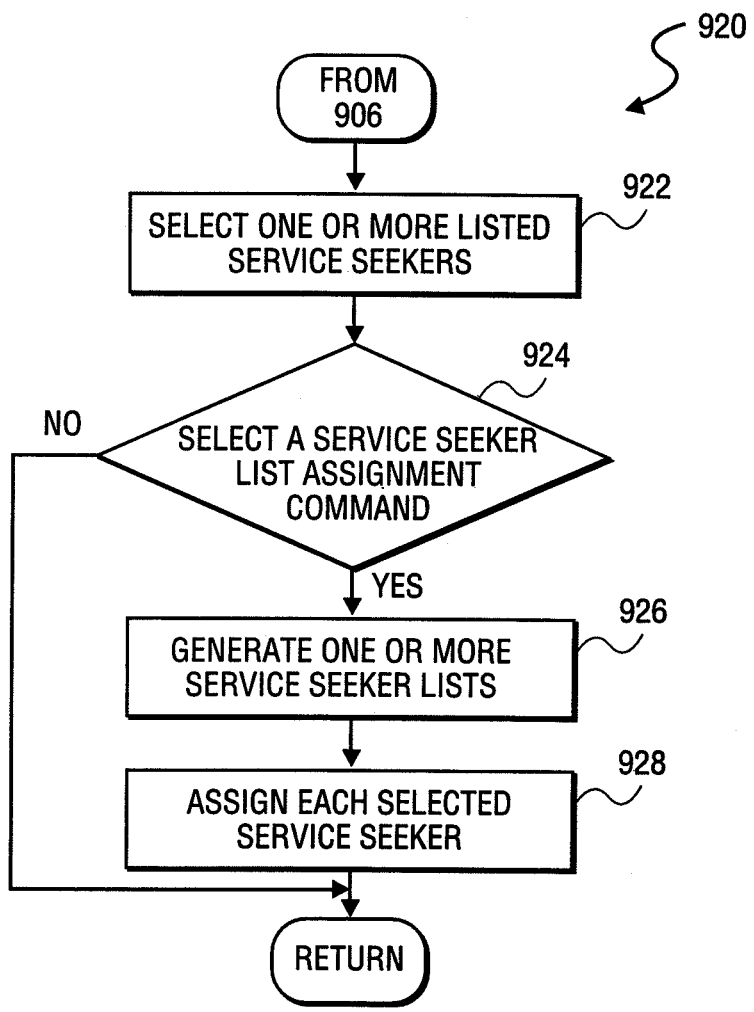
FIG. 18 depicts a flowchart illustrating an additional method for processing selected service seekers in response to a list assignment command in accordance with an exemplary embodiment of the present invention.

Referring now to FIG. 18, FIG. 18 depicts a flowchart illustrating a method 920 for processing the service seeker list according to a customer management processing option, for example as depicted in FIG. 3. At process block 922, one or more service seekers are selected from the customer management screen 500. Once selected, at process block 934, a service seeker list assignment command 920 is selected at process block 924. Next, at process block 926, one or more service seeker lists are generated, using for example the customer listing procedures 338. Finally, at process block 928, the service provider assigns each selected service provider to the one or more generated service seeker lists, for example as depicted via customer list screen 700, as depicted in FIG. 6.

Figure 19:
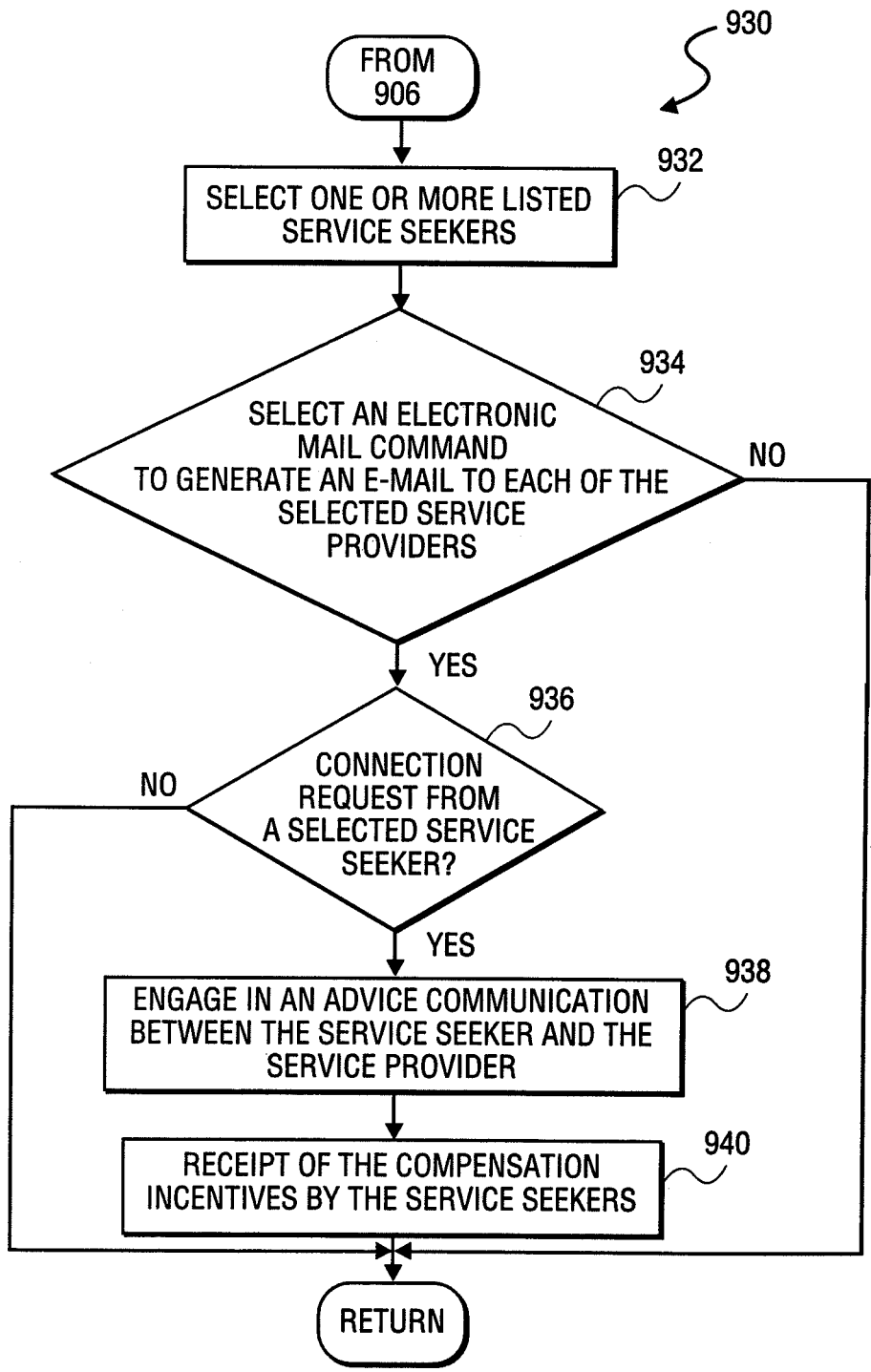
FIG. 19 depicts a flowchart illustrating a method for providing incentive compensation to service providers in accordance with an exemplary embodiment of the present invention.

Referring now to FIG. 19, FIG. 19 depicts a flow chart illustrating a method 930 for providing incentive compensation to service providers. At process block 932, one or more service seekers are selected from the listing 520 of the customer management screen 500. Next, at process block 934, the service provider selects the compose e-mail option 506 to generate an e-mail to each of the selected service providers. In one embodiment, the e-mail may include compensation incentives for receipt of repeat advice communication from the service provider. Next, at process block 938, it is determined whether a connection request is received from one or more of the service seekers receiving the compensation incentives. Once received, at process block 938, the service provider and the service seeker may engage in advice communication. On the advice communication is complete, at process block 940, the service seeker is provided with the compensation incentives, utilizing for example the customer incentive procedures 342.

Figure 20:
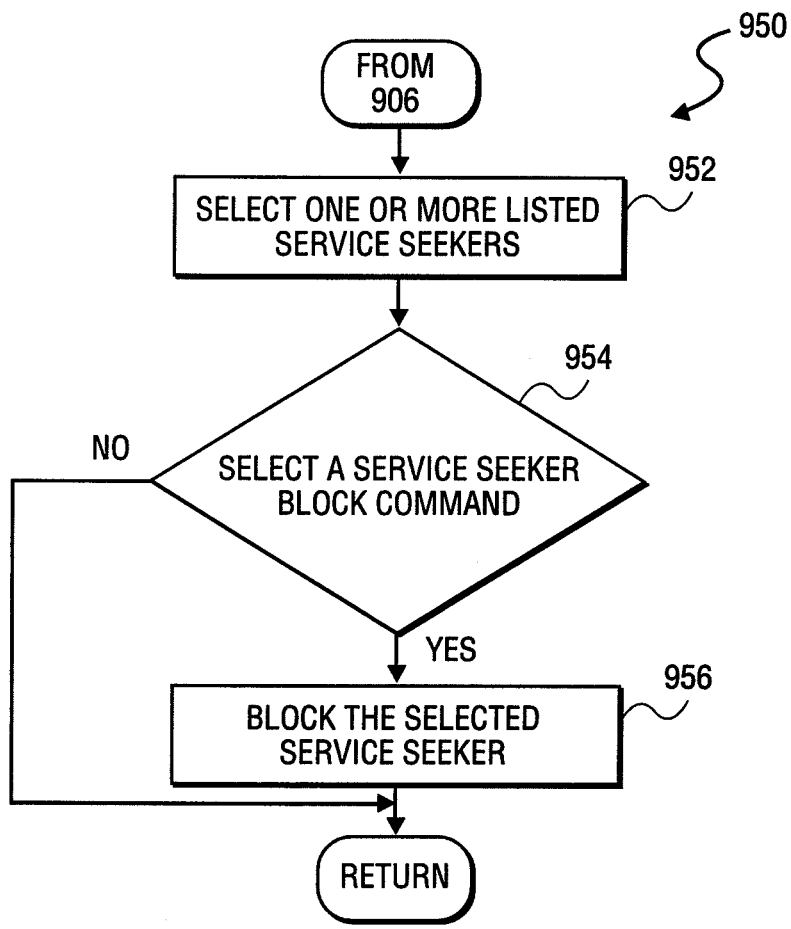
FIG. 20 depicts a flowchart illustrating a method for blocking selected service seekers from receiving repeat live advice communications from a respective service provider in accordance with an exemplary embodiment of the present invention.

Finally, referring to FIG. 20, FIG. 20 depicts a flowchart illustrating a method for blocking service seekers from repeat receipt of advice communications from a respective service provider, utilizing for example the customer blocking procedures 336, as depicted in FIG. 2A. At process block 952, the service provider will select one or more service seekers listed in the customer management screen 500. Next, at process block 954, the service provider will select a service seeker block command. Once selected, at process block 956, the service provider system 100 utilizing the customer block procedures 336 will block the selected service seekers from receiving and engaging in advice communications with the service provider.

Accordingly, as described herein, the customer relationship management procedures enable systems that provide live or recorded advice via communication means, such as e-mail or via online access, with means for tracking the various customers that have solicited and received advice from the various systems. Utilizing these customer tracking options and management functions, the various providers within the systems, as well as the administrator of the systems, may track the various customers and device means for engaging the customers in repeat business. In doing so, the service provider systems will generate increased compensation for themselves and in systems that collect a portion of the fees provided from the service seekers to service providers, additional compensation will be received by the system.

Furthermore, the customer relationship management options may be utilized by service providers in order to provide improved communication advice to service seekers by utilizing such options as customer description procedures 344, as depicted in FIG. 2A, and customer contact screen 630 to make notes regarding each advice communication with a service seeker. Such notes may be utilized in order to better understand the service seekers problems and provide improved advice communication in the future. Accordingly, the quality of service provided by such a system will be improved, resulting in repeat business, as well as additional customers.

ALTERNATE EMBODIMENTS

Several aspects of one implementation of the online advice customer relationship management system for providing customer relationship management have been described. However, various implementations of the online advice customer relationship management system provide numerous features including, complementing, supplementing, and/or replacing the features described above. Features can be implemented as part of an online system or as part of a client-server system in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to an online advice customer relationship management system, it will be appreciated by those skilled in the art that the teaching of the present invention can be applied to other systems. In fact, systems for tracking customers who receive online advice via audio transmission mediums are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to enable service providers of service provider systems to track the various customers that have received live advice from the various service providers. In doing so, the service providers may provide incentives to service seekers that have received live advice from the service provider in order to induce repeat business. The service provider can also track service seekers and receive alerts from the system for initiating e-mail contact with service seekers designated by the system as most likely to engage in repeat business. The customer relationship tool described herein enables service providers to track clients in order to generate follow-up business, which will provide increased compensation for the service providers and as a result, provide increased compensation for the service provider system, which collects a portion of the fees charged by the service providers for providing live advice regarding one or more fields of service.

Having disclosed exemplary embodiments and the best mode, modifications and variations may be made to the disclosed embodiments while remaining within the scope of the invention as defined by the following claims.

The invention claimed is:

1. A method, comprising:
identifying, via a computing device, a list of a plurality of service seekers, each respective service seeker of the service seekers having previously received a service from a particular service provider, as identified from at least one service transaction record stored in a service transaction record database for at least one service transaction between the respective service seeker and the particular service provider;
presenting a single user interface to the particular service provider, the single user interface including:
the list of the service seekers;
first user interface elements to select a subset of the service seekers; and
at least one second user interface element selectable to activate at least one command;
receiving, from the particular service provider using the first user interface elements in the single user interface, a selection of at least one service seeker having previously received a service from the particular service provider; and
in response to receiving an activation of the command, processing the at least one service seeker to manage communications between the at least one service seeker and the particular service provider according to the command.

2. The method of claim 1, wherein the processing of the at least one service seeker comprises blocking the at least one service seeker from contacting the service provider.

3. The method of claim 1, wherein the processing of the at least one service seeker comprises providing the service provider a process to contact the at least one service seeker.

4. The method of claim 1, wherein the at least one service seeker includes a plurality of service seekers; and services received from the particular service provider comprise advice.

5. The method of claim 1, further comprising:
presenting a listing of the particular service provider to service seekers;
in response to a first service seeker selecting the listing, providing a communication connection between the first service seeker and the particular service provider; and
charging the first service seeker on behalf of the particular service provider for a service provided by the particular service provider over the communication connection.

6. The method of claim 5, wherein the providing of the communication connection comprises:
establishing a first phone connection to the first service seeker;
establishing a second phone connection to the particular service provider; and
connecting the first phone connection and the second phone connection to connect the first service seeker and the particular service provider.

7. The method of claim 6, wherein the first phone connection comprises a first phone call; the second phone connection comprises a second phone call; and connecting the first phone connection and the second phone connection comprises conferencing the first phone call and the second phone call.

8. The method of claim 6, further comprising:
keeping track of time spent on the communication connection between the first service seeker and the particular service provider.

9. The method of claim 1, further comprising:
determining an identification of the particular service provider based on a request received from the service provider;
wherein the user interface is presented based on the identification of the particular service provider determined based on the request received from the particular service provider.

10. The method of claim 9, wherein the determining of the identification of the particular service provider comprises:
receiving a selection of a link from the service provider, after authentication of the service provider.

11. The method of claim 1, wherein services provided by the particular service provider are at least one of: live advice provided over a phone, recorded audio advice provided over a phone, and written advice provided via electronic mail.

12. The method of claim 1, further comprising:
sorting the list of service seekers according to a date of contact with the particular service provider.

13. The method of claim 12, wherein the at least one second user interface element includes at least one link associated with the at least one command.

14. The method of claim 13, further comprising:
identifying at least one of the service seekers as a potential repeat customer according to pre-determined criteria.

15. The method of claim 14, further comprising:
providing an alert to the particular service provider for the potential repeat customer.

16. The method of claim 14, further comprising:
notifying the particular service provider to initiate contact with the potential repeat customer.

17. The method of claim 16, further comprising:
assigning the at least one service seeker to a category.

18. A non-transitory computer readable storage medium storing instructions configured to instruct a computing device to perform a method, the method comprising:
identifying a list of a plurality of service seekers of a particular service provider based on records stored in a transaction database, wherein the transaction database stores records of service transactions between respective service seekers and respective service providers, including the particular service provider;
presenting a single user interface to the particular service provider, the single user interface including:
the list of the plurality of service seekers of the particular service provider;
first user interface elements to select a subset of the service seekers; and at least one second user interface element selectable to activate at least one command;

receiving, from the particular service provider using the first user interface elements in the single user interface, a selection of at least one service seeker;

in response to receiving an activation of the command using the second user interface element, processing the at least one service seeker to manage communications between the at least one service seeker and the particular service provider according to the command.

19. A system, comprising:

a processor configured to identify a list of a plurality of service seekers, each respective service seeker of the service seekers having previously received a service from a service provider, as identified from at least one service transaction record stored in a service transaction record database for at least one service transaction between the respective service seeker and the particular service provider; and a communication device configured to present a single user interface to the particular service provider, the single user interface including:

the list of the service seekers;

first user interface elements to select a subset of the service seekers; and at least one second user interface element selectable to activate at least one command;

wherein the communication device is further configured to receive, from the particular service provider using the first user interface elements in the single user interface, a selection of at least one service seeker; and wherein the processor is further configured to, in response to receiving an activation of the command, process the at least one service seeker to manage communications between the at least one service seeker and the particular service provider according to the command.

20. The system of claim 19, wherein the processor is further configured to identify at least one service seeker as a potential repeat customer; and the communication device is further configured to provide an alert to the particular service provider for the potential repeat customer.

21. The system of claim 19, further comprising:

the service transaction record database storing records of service transactions between respective service seekers and respective service providers, including the particular service provider.

* * * * *